US011986723B1

(12) United States Patent
Andres

(10) Patent No.: US 11,986,723 B1
(45) Date of Patent: May 21, 2024

(54) BRAKE ASSEMBLY FOR LONGBOARD

(71) Applicant: The Brake Boys, LLC, Lake Oswego, OR (US)

(72) Inventor: Jesse Andres, Lake Oswego, OR (US)

(73) Assignee: The Brake Boys, LLC, Lake Oswego, OR (US)

( * ) Notice: Subject to any disclaimer, the term of this patent is extended or adjusted under 35 U.S.C. 154(b) by 592 days.

(21) Appl. No.: 16/880,615

(22) Filed: May 21, 2020

Related U.S. Application Data

(60) Provisional application No. 62/966,984, filed on Jan. 28, 2020, provisional application No. 62/852,177, filed on May 23, 2019.

(51) Int. Cl.
| | |
|---|---|
| *F16D 49/00* | (2006.01) |
| *A63C 17/01* | (2006.01) |
| *A63C 17/14* | (2006.01) |
| *F16D 65/06* | (2006.01) |
| *F16D 65/16* | (2006.01) |
| *A63C 17/00* | (2006.01) |
| *F16D 121/14* | (2012.01) |
| *F16D 125/60* | (2012.01) |
| *F16D 125/64* | (2012.01) |
| *F16D 127/04* | (2012.01) |

(52) U.S. Cl.
CPC ........ *A63C 17/1418* (2013.01); *A63C 17/014* (2013.01); *F16D 49/00* (2013.01); *F16D 65/06* (2013.01); *F16D 65/16* (2013.01); *A63C 2017/1463* (2013.01); *F16D 2121/14* (2013.01); *F16D 2125/60* (2013.01); *F16D 2125/64* (2013.01); *F16D 2127/04* (2013.01)

(58) Field of Classification Search
CPC ... F16D 49/00; A63C 17/1418; A63C 17/014; A63C 2017/1463
See application file for complete search history.

(56) References Cited

U.S. PATENT DOCUMENTS

| | | | |
|---|---|---|---|
| 3,385,608 A | 5/1968 | Waddell | |
| 3,945,655 A | 3/1976 | Banks et al. | |
| 4,003,582 A | 1/1977 | Maurer | |
| 4,027,890 A | 6/1977 | Volkmann | |
| 4,037,852 A | 7/1977 | Bayer et al. | |
| 4,076,266 A * | 2/1978 | Krausz | A63C 17/1409 16/48 |
| 4,084,831 A | 4/1978 | Akonteh et al. | |

(Continued)

FOREIGN PATENT DOCUMENTS

| | | | | |
|---|---|---|---|---|
| DE | 2632555 A | * 2/1978 | ......... | A63C 17/1418 |
| DE | 2723154 A | * 12/1978 | ............. | A63C 17/01 |

(Continued)

*Primary Examiner* — Melody M Burch
(74) *Attorney, Agent, or Firm* — Klarquist Sparkman, LLP

(57) ABSTRACT

A brake assembly for a longboard can include an anchor member coupled to a rear hanger member of a longboard, a brake lever member coupled to a brake pad, and a pedal assembly coupled to the brake lever member via at least one cable. The brake lever member can be pivotably coupled to the anchor member and movable between an applied position wherein the brake pad contacts a wheel of the longboard and an unapplied position. The pedal assembly can selectively move the brake lever between the applied position and the unapplied position when actuated by a user.

5 Claims, 29 Drawing Sheets

(56) References Cited

U.S. PATENT DOCUMENTS

| | | | |
|---|---|---|---|
| 4,094,524 A | | 6/1978 | Carroll |
| 4,166,519 A | | 9/1979 | Maloney |
| 4,183,546 A | * | 1/1980 | Heilig ................ A63C 17/1409 |
| | | | 280/11.212 |
| 6,332,514 B1 | * | 12/2001 | Chen ....................... F16D 67/02 |
| | | | 192/70.23 |
| 6,820,881 B1 | | 11/2004 | Berry |
| 8,371,594 B2 | | 2/2013 | Palmer et al. |
| 8,522,928 B2 | | 9/2013 | Orcutt |
| 9,504,902 B1 | | 11/2016 | Johnson |
| 9,504,903 B2 | | 11/2016 | Newman |
| 9,522,320 B1 | | 12/2016 | McDowell |
| 2002/0043777 A1 | * | 4/2002 | Ireton ................ A63C 17/1427 |
| | | | 280/87.041 |

FOREIGN PATENT DOCUMENTS

| | | | | |
|---|---|---|---|---|
| GB | 2158401 A | * | 11/1985 | ............. A63C 17/12 |
| WO | WO-2015145349 A1 | * | 10/2015 | ............. B60T 11/046 |

\* cited by examiner

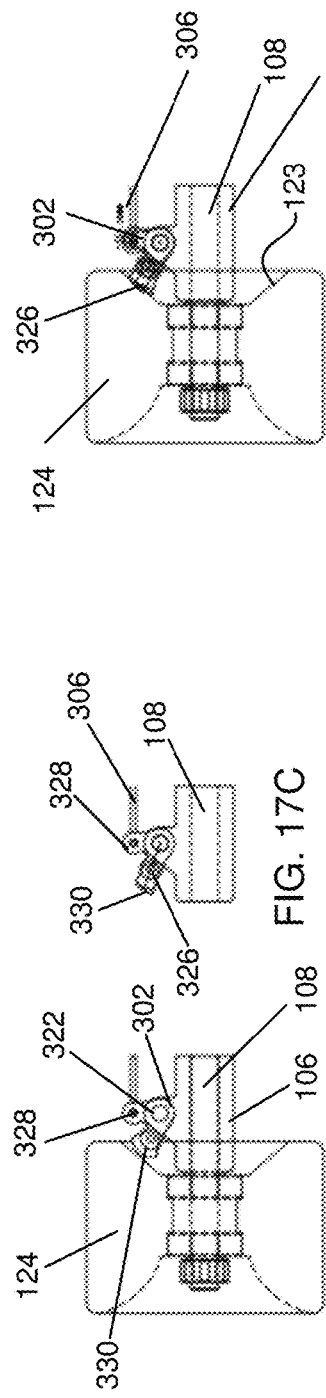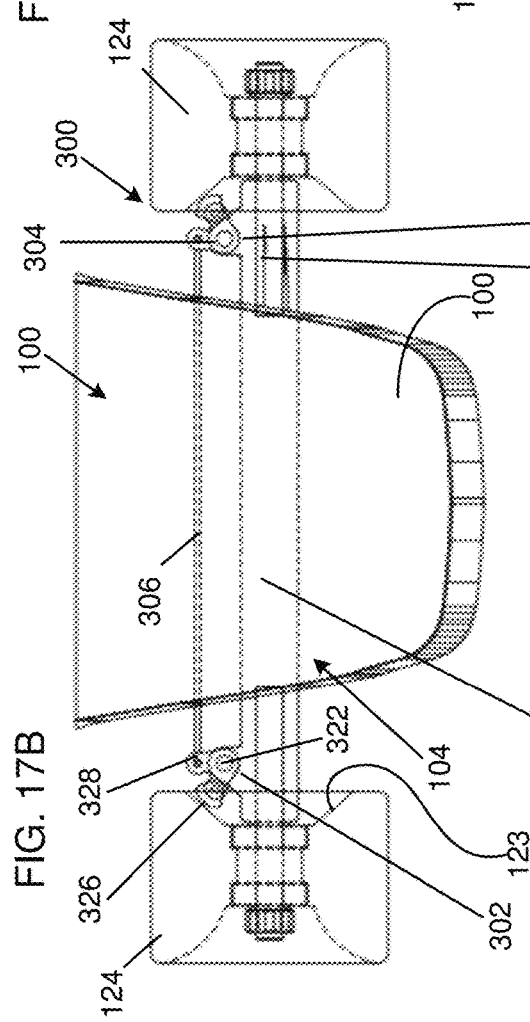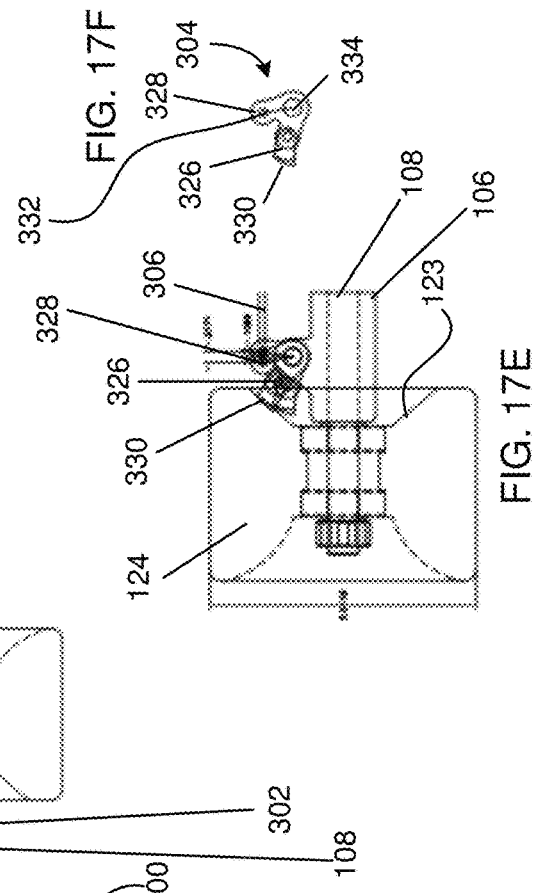

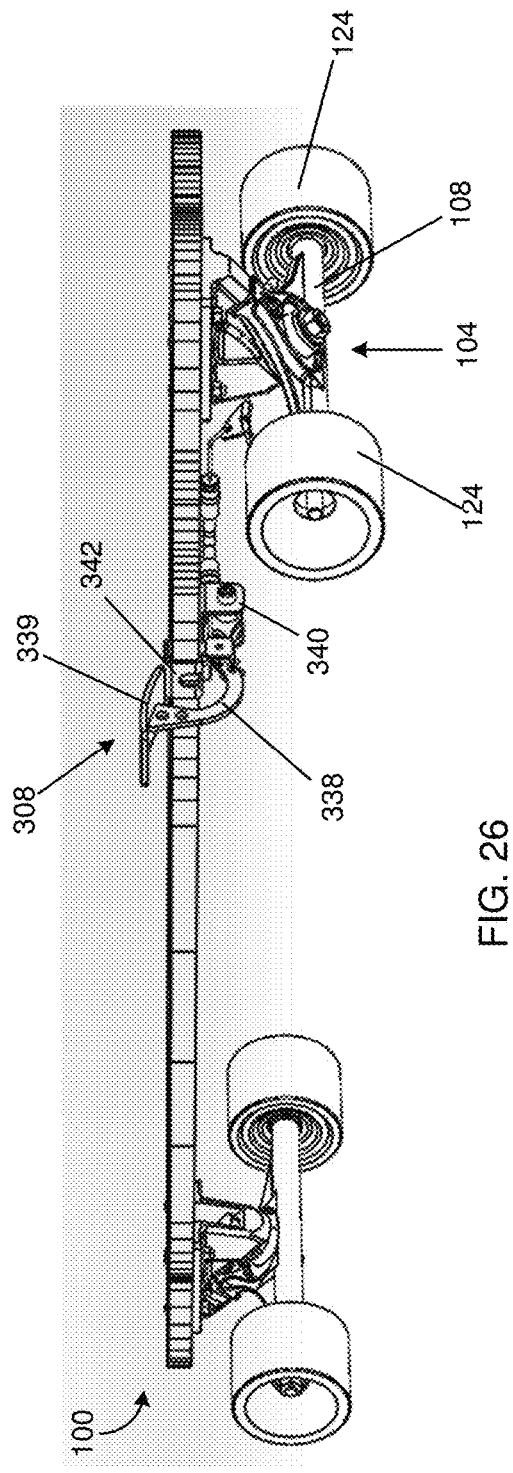
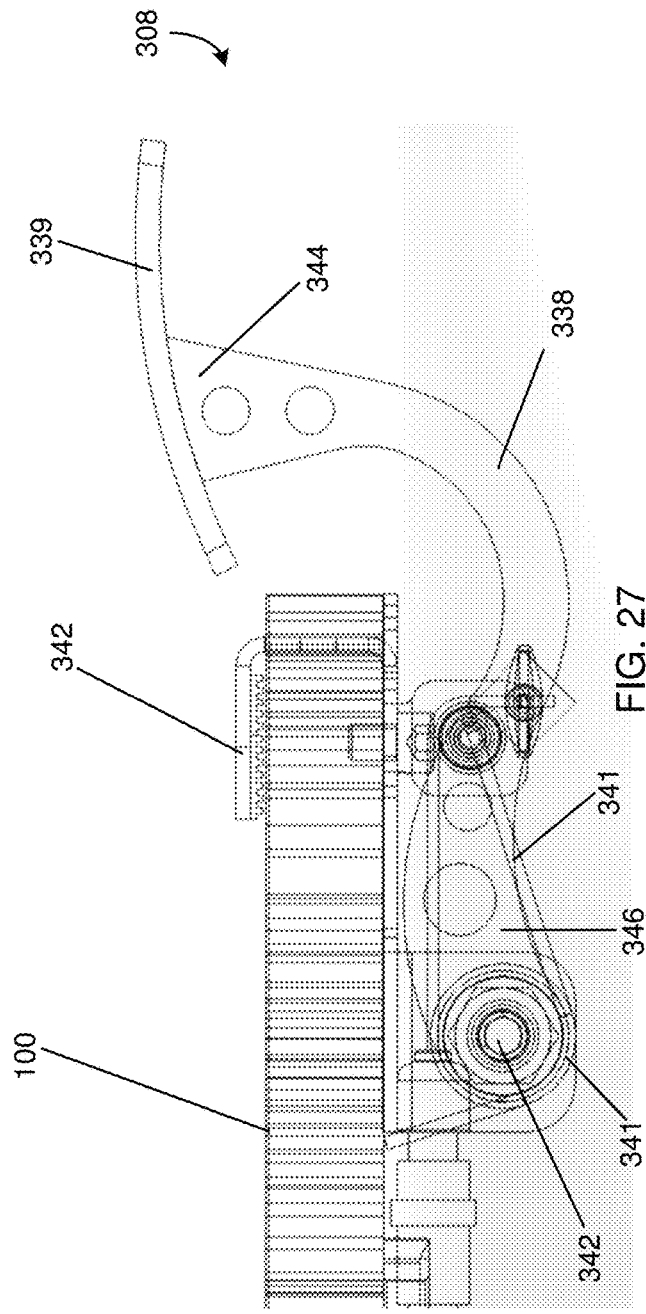
FIG. 26
FIG. 27

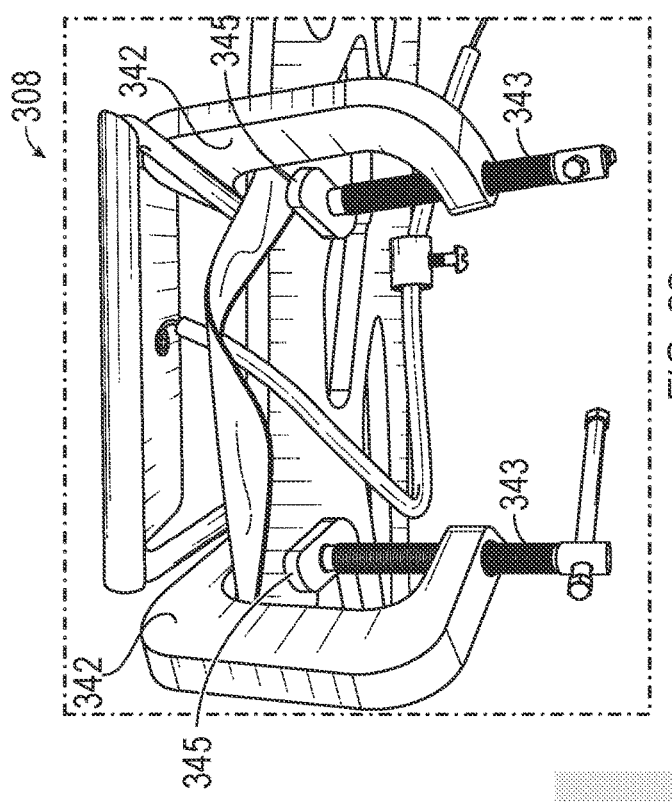
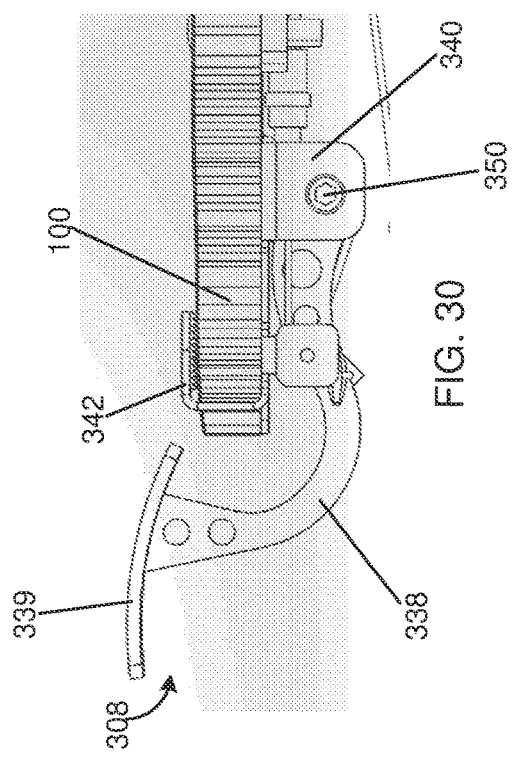
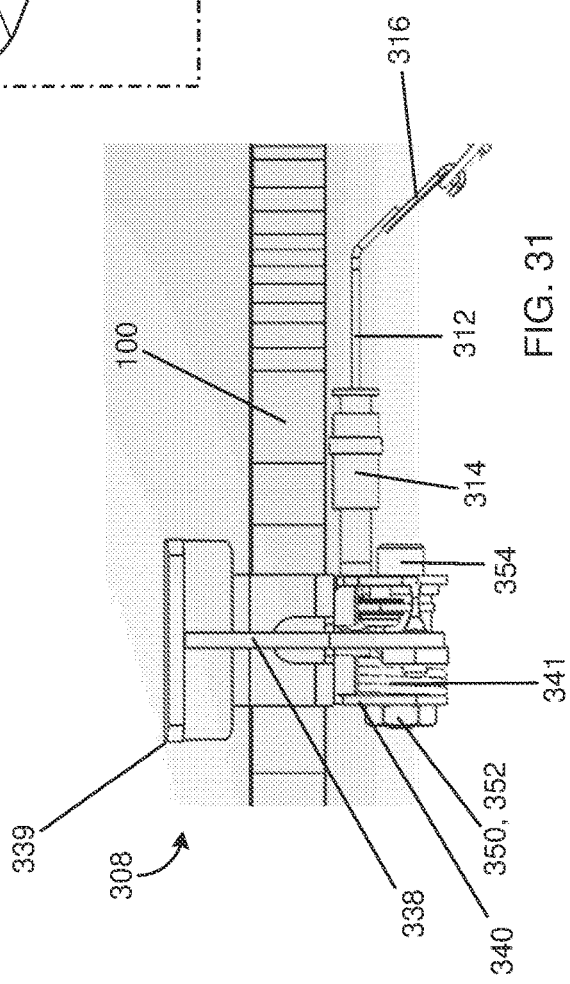

BRAKE ASSEMBLY FOR LONGBOARD

CROSS-REFERENCE TO RELATED APPLICATIONS

This application claims the benefit of U.S. Provisional Application 62/966,984, filed Jan. 28, 2020, and U.S. Provisional Application 62/852,177, filed May 23, 2019. Each of U.S. Provisional Application 62/966,984 and U.S. Provisional Application 62/852,177 is incorporated by reference herein in its entirety.

FIELD

The present disclosure relates to brake assemblies for rolling or sliding conveyances, such as longboards and skateboards.

BACKGROUND

Longboards and skateboards are a class of sports equipment that can be used for travelling, racing, performing tricks, and other activities. Longboards comprise an elongated body or board for a user to stand on and four wheels coupled to the board to move the longboard along the ground. When a user is riding a traditional longboard and desires to stop the board, the user can either slide the board or use their feet to stop the board. However, such methods of stopping can result in injury to the user and/or damage to the board, the user's shoes, and/or the user's feet. Accordingly, a need exists for mechanical braking assemblies for longboards and skateboards.

SUMMARY

In a representative embodiment, a brake assembly for a longboard can comprise an anchor member coupled to a rear hanger member of a longboard and a brake lever member coupled to a brake pad. The brake lever member can be pivotably coupled to the anchor member and movable between an applied position, wherein the brake pad is configured to contact a wheel of a longboard, and an unapplied position. The brake assembly can further comprise a pedal assembly coupled to the brake lever member via at least one cable, the pedal assembly configured to selectively move the brake lever member between the applied position and the unapplied position when actuated by a user.

In some or all embodiments, the brake assembly can further comprise a biasing member configured to bias the brake lever member into the unapplied position.

In some or all embodiments, the pedal assembly comprises a lever arm including an extension member, the extension member coupled to a pedal member. In some or all such embodiments, the extension member is coupled to the at least one cable such that applying a force to the pedal member tensions the at least one cable.

In some or all embodiments, the anchor member is a first anchor member coupled to a first end portion of the rear hanger member and the brake lever is a first brake lever coupled to the first anchor member and wherein the brake assembly further comprises a second anchor member coupled to a second brake lever, the second anchor member coupled to a second end portion of the rear hanger member. In some or all such embodiments, the at least one cable is a first cable coupled to and extending between the first and second brake levers.

In some or all embodiments, the at least one cable is a first cable extending through a cable anchor, and wherein the brake assembly further comprises a second cable having a first end portion coupled to the cable anchor and a second end portion coupled to the pedal assembly.

In a representative embodiment, a truck assembly for a longboard can comprise a hanger, an axle member extending through the hanger member and configured to mount a pair of wheels, and a brake lever member coupled to the hanger member via an anchor member. The brake lever member can be movable between a first position and a second position in which the brake lever member is configured to contact a wheel. The truck assembly can further comprise a pedal assembly coupled to the brake lever member by a linkage assembly and configured to actuate the brake lever member between the first position and the second position.

In some or all embodiments, a longboard can comprise the truck assembly.

In some or all embodiments, the truck assembly can further comprise a biasing member configured to bias the brake lever member away from a wheel.

In some or all embodiments, the pedal assembly comprises an extension member comprising a first end portion coupled to a pedal member and a second end portion coupled to the linkage assembly.

In some or all embodiments, the truck assembly can further comprise a housing extending from the pedal assembly through which a portion of the linkage assembly extends.

In a representative embodiment, a kit can include one or more anchor members couplable to a rear hanger member of a longboard, one or more brake lever members each couplable to a respective brake pad, each brake lever member pivotably couplable to a respective anchor member, and a pedal assembly. The pedal assembly can be couplable to the one or more brake lever members via at least one cable, and can be configured to move the brake lever member between an applied position and an unapplied position when actuated by a user.

BRIEF DESCRIPTION OF THE DRAWINGS

FIGS. 17A-17F show another exemplary brake assembly for a longboard.

FIG. 26 is a perspective view of an exemplary longboard comprising an exemplary brake assembly.

FIG. 27 is a side view of an exemplary brake pedal.

FIG. 30 is a side view of the brake pedal of FIG. 27.

FIG. 31 is a side view of the brake pedal of FIG. 27.

FIG. 32 is a perspective view of another exemplary brake pedal.

DETAILED DESCRIPTION

Figure 14:
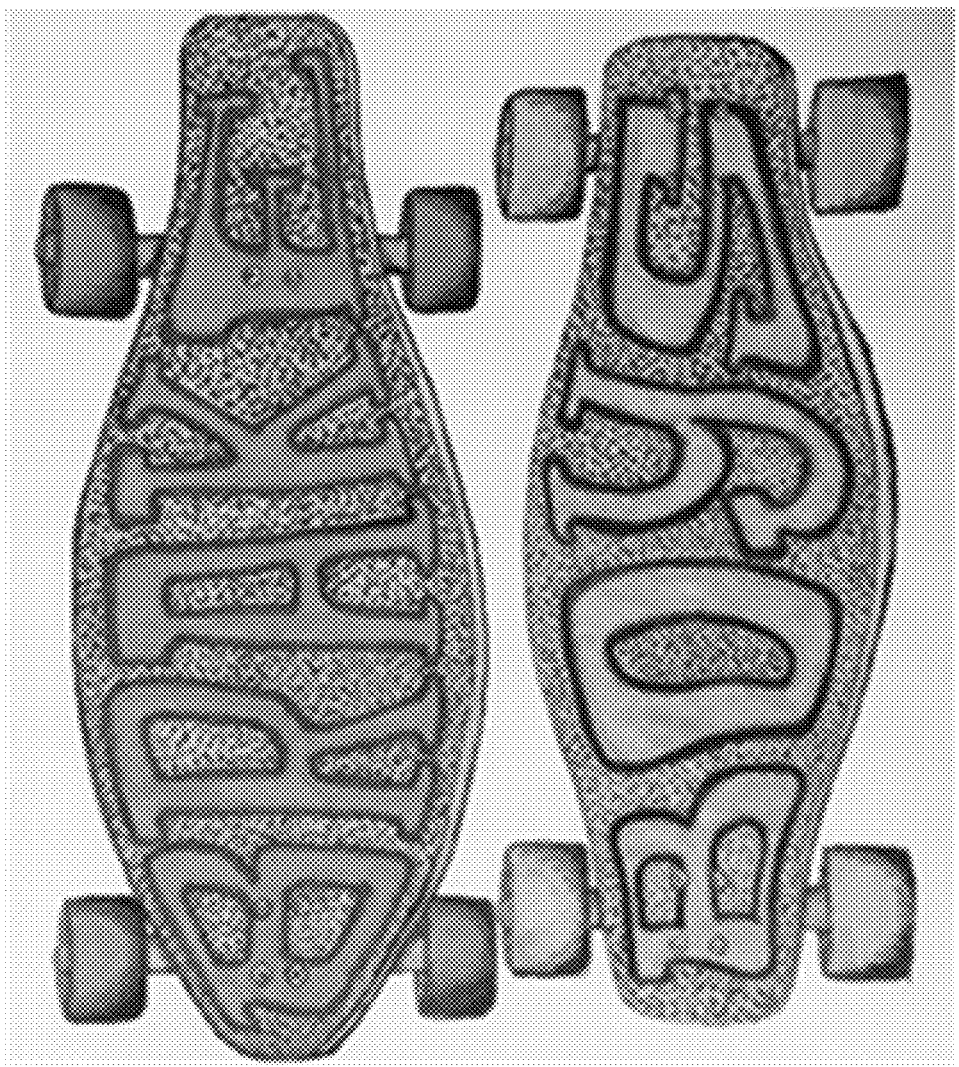
FIGS. 14-15 show exemplary embodiments of longboards.

Longboards and skateboards are a class of sports equipment that can be used for travelling, racing, performing tricks, and other activities. Longboards comprise an elongated body or board for a user to stand on and four wheels coupled to the board to move the longboard along the ground. As used herein, the term "longboard" refers to all types of skateboards, regardless of length. FIG. 14 shows two exemplary longboards 100 and 101. Additionally, although the following description proceeds with reference to longboards, the brake assembly embodiments described herein can also be adapted for use with other types of rolling or sliding conveyances on which a user stands, crouches, and/or sits, such as scooters, recumbent bicycles, snow boards, surf boards, and the like.

Figure 15:
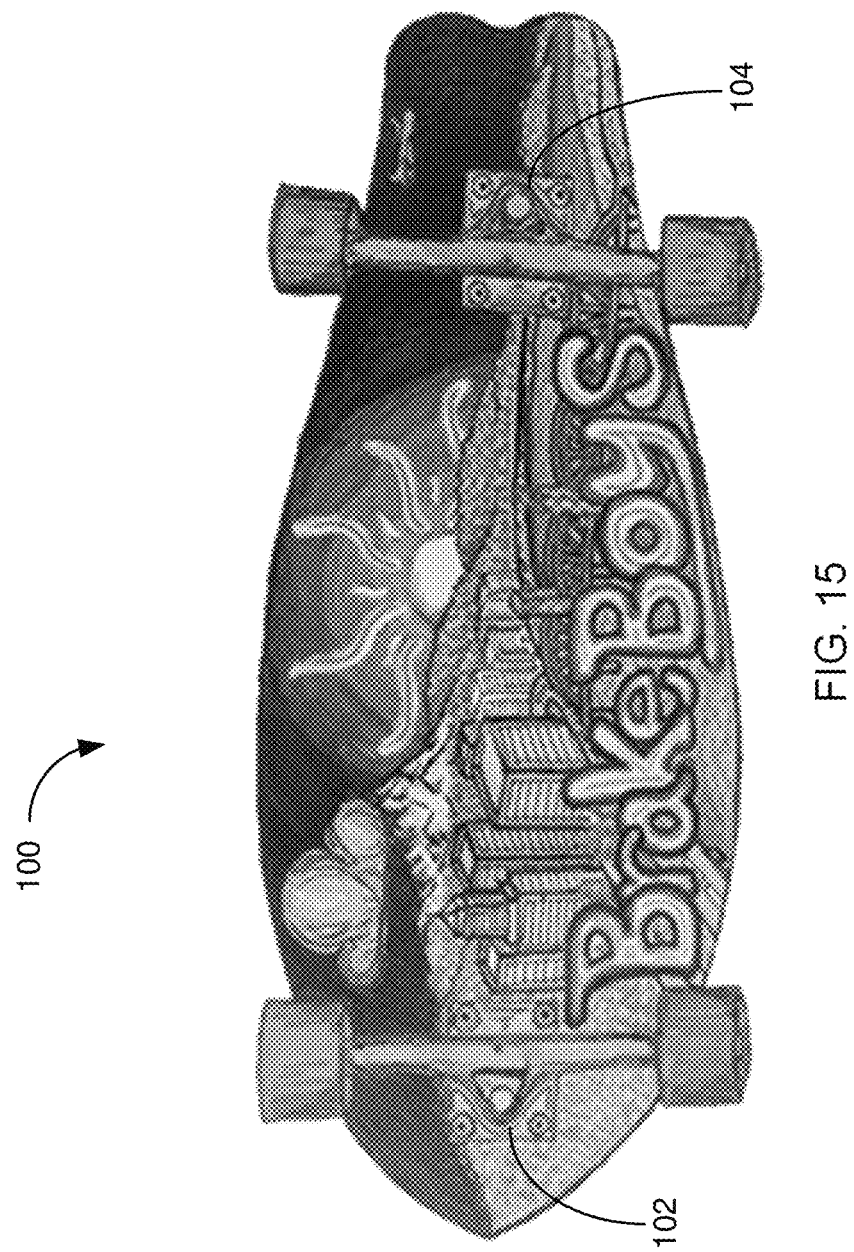

Longboards typically have two trucks mounted on the underside of the board, a front truck near the front of the board and a rear truck near the back of the board. The trucks can be attached to the wheels and can pivot such that the longboard wheels can turn. FIG. 15 shows the longboard 100 with a front truck 102 and a rear truck 104.

When a user is riding a traditional longboard and desires to stop the board, the user can either slide the board or use their feet to stop the board. However, some users desire longboards with a mechanical braking option. Accordingly, disclosed herein are brake assemblies for a longboard.

The brake assemblies disclosed herein can be used with known longboards. Specifically, the brake assembly disclosed herein can be attached to a truck. The modified truck can then be affixed to the longboard (e.g., as the rear truck of the longboard) and used as a braking system when riding the longboard. Some longboard braking systems are known but have significant drawbacks. Some longboard brake assemblies require modification of the longboard itself, such as drilling holes in the board or attaching extra parts. Such modifications can be difficult to perform correctly and can potentially damage the board if done incorrectly. Other longboard brake assemblies do not turn when the longboard wheels turn. This can lead to "wheel bite," wherein the brake is activated or contacts the wheels inadvertently when the trucks pivot as the longboard turns. The brake assemblies disclosed herein can overcome these disadvantages.

Figure 1:
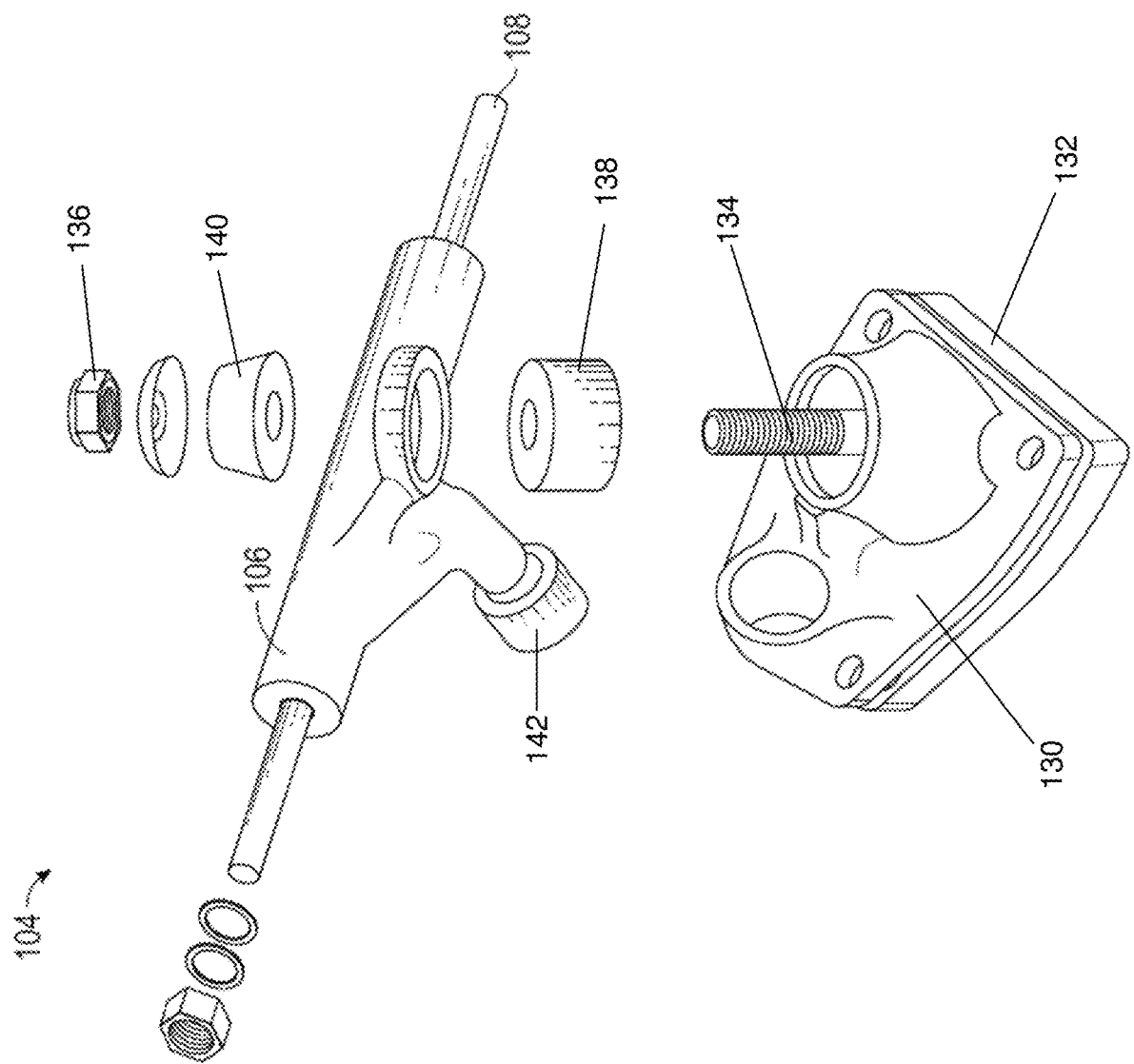
FIG. 1 shows an exemplary truck for a longboard, according to one embodiment.

FIG. 1 shows an exploded view of a typical truck 104. The truck 104 can comprise a hanger 106 including a base portion and a cylindrical portion and an axle 108 that extends through the cylindrical portion of the hanger 106. The hanger 106 can be coupled to the longboard 100 via a base plate 130 and a riser pad 132. A fastener 134, such as a bolt or pin, including a nut 136 can couple the hanger 106 to the base plate 130. The truck 104 can further comprise one or more bushings/grommets/cushions, for example, a first bushing 138, a second bushing 140, and a third bushing 142 configured as a pivot bushing. The second bushing 140 can have a frusto-conical shape, as shown in FIG. 1.

The wheels of the longboard can be connected to the ends of the axle 108. In certain embodiments, the brake assemblies disclosed herein can be affixed to the hanger 106 to modify the truck 104. The modified truck can then be attached to the lower side of the board 100 using known techniques (e.g., using screws, bolts, fasteners, etc.). In some embodiments, the modified truck can be manufactured with the brake assembly affixed to the hanger 106 such that the truck and the brake assembly form a standalone unit that can be attached to a longboard.

Figure 2:
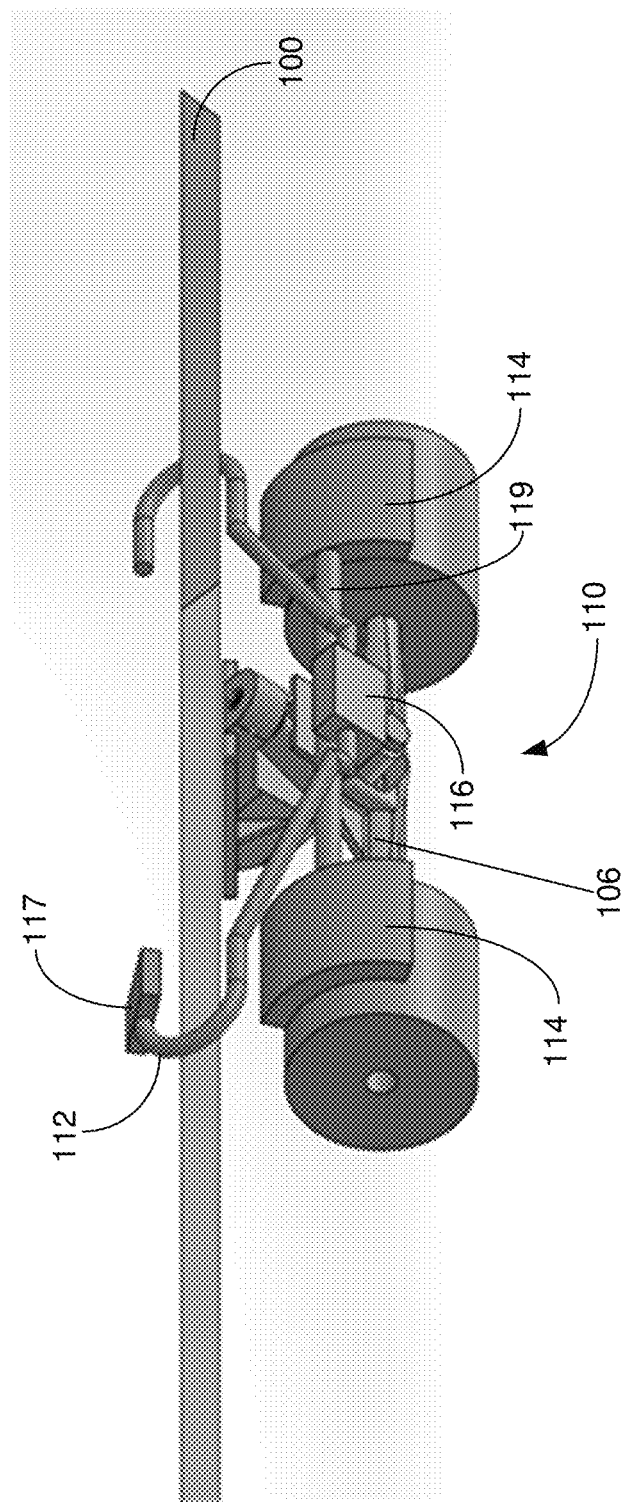
FIG. 2 shows an exemplary brake assembly for a longboard, according to one embodiment.
Figure 8:
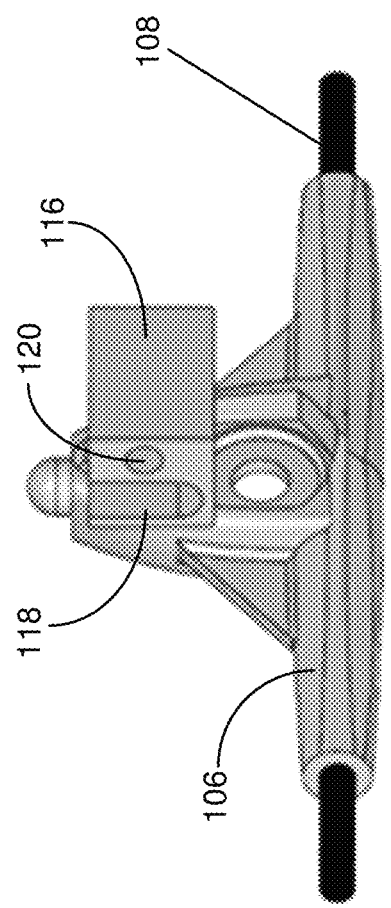

FIG. 2 shows an exemplary brake assembly 110 coupled to a truck assembly, which is in turn coupled to a longboard 100. The brake assembly 110 can comprise a brake lever member 112, brake pads 114, and an alignment member or compartment 116. The alignment compartment 116 can be attached to the underside of the hanger 106 as shown in FIG. 8. In some embodiments, the hanger 106 can have a threaded opening, and the alignment compartment 116 can have a corresponding opening such that the hanger and the alignment compartment can be attached together using a threaded screw.

Figure 7:
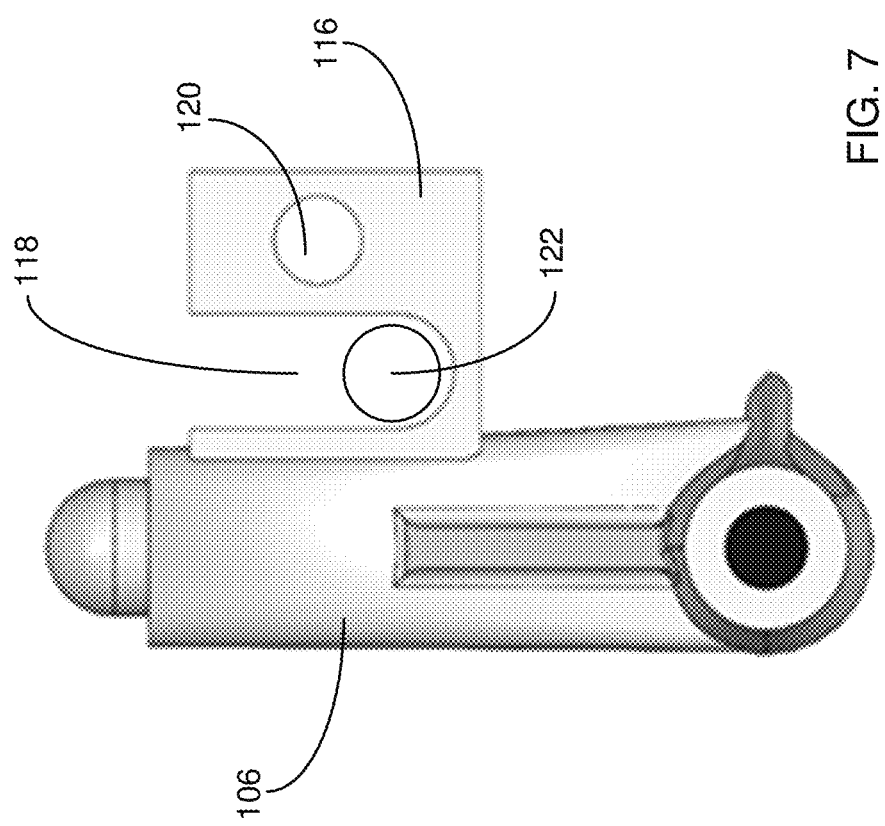
FIGS. 7-8 show an exemplary alignment compartment, according to one embodiment.

The alignment compartment 116 can have a U-shaped opening 118 and a bore 120 extending through a side portion of the alignment compartment, as best shown in FIG. 7. In some embodiments, one or more compression springs schematically indicated at 122 can be positioned within the U-shaped opening 118 and affixed to a lower portion of the alignment compartment 116. In other embodiments, other biasing members, such as extension or torsion springs can be used in place of compression springs 122. In particular embodiments, the alignment compartment can comprise four springs 122.

Figure 3:
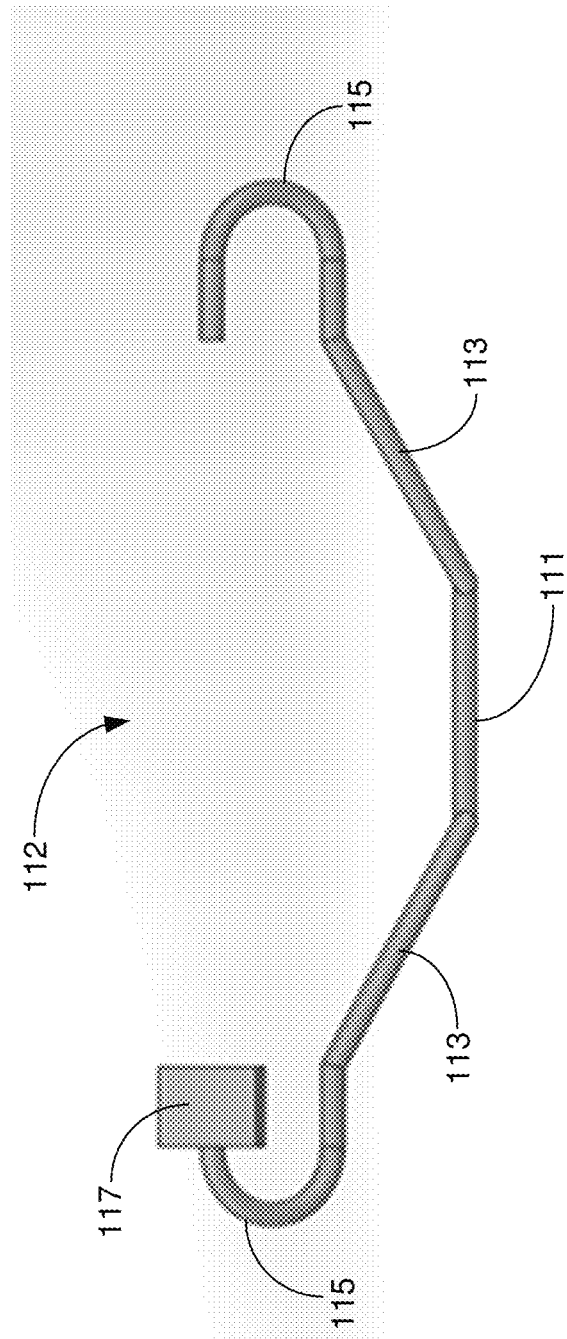
FIGS. 3-4 show an exemplary brake pedal, according to one embodiment.
Figure 4:
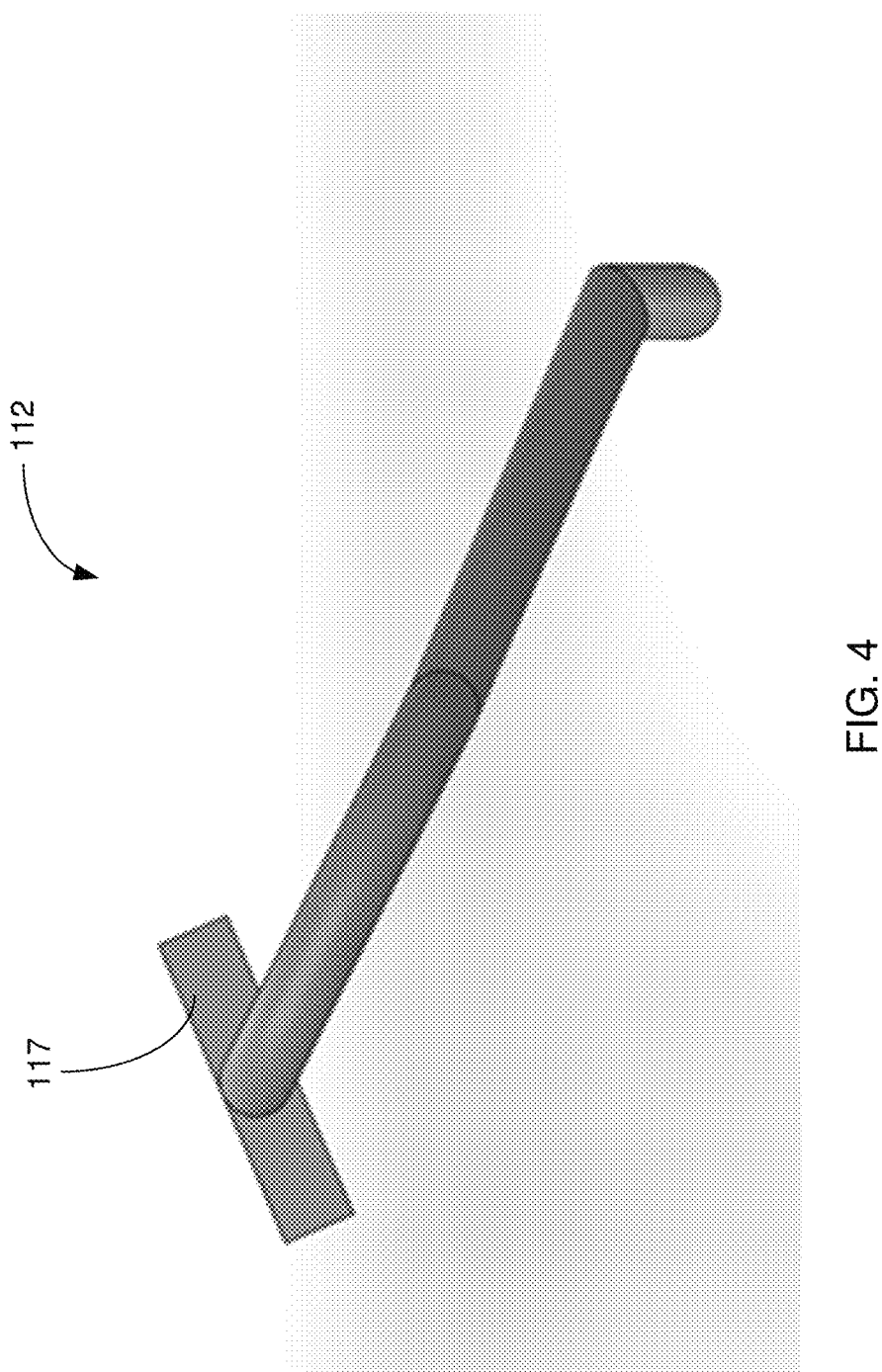
Figure 11:
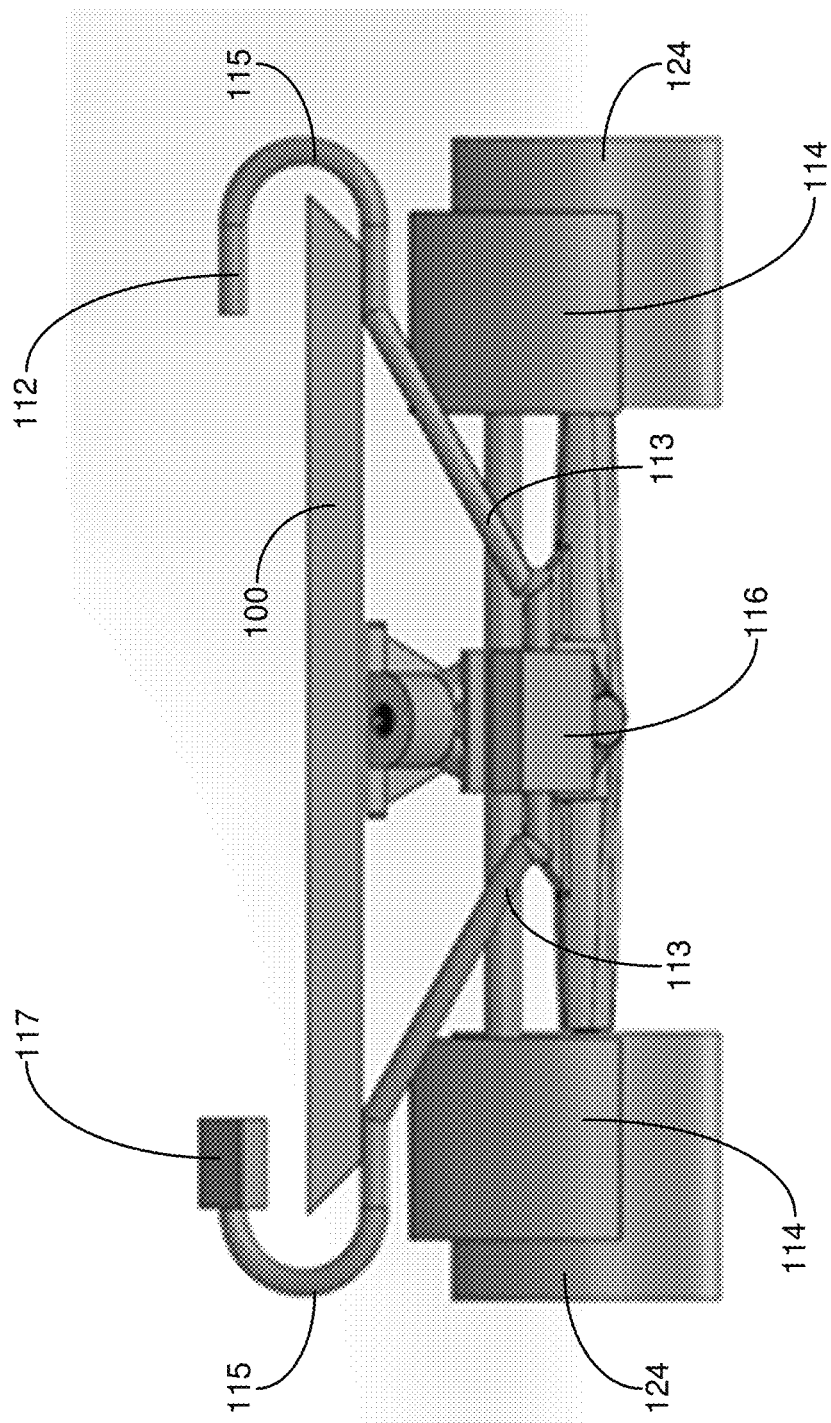
FIGS. 11-13 show the exemplary brake assembly of FIG. 2 attached to a longboard.
Figure 12:
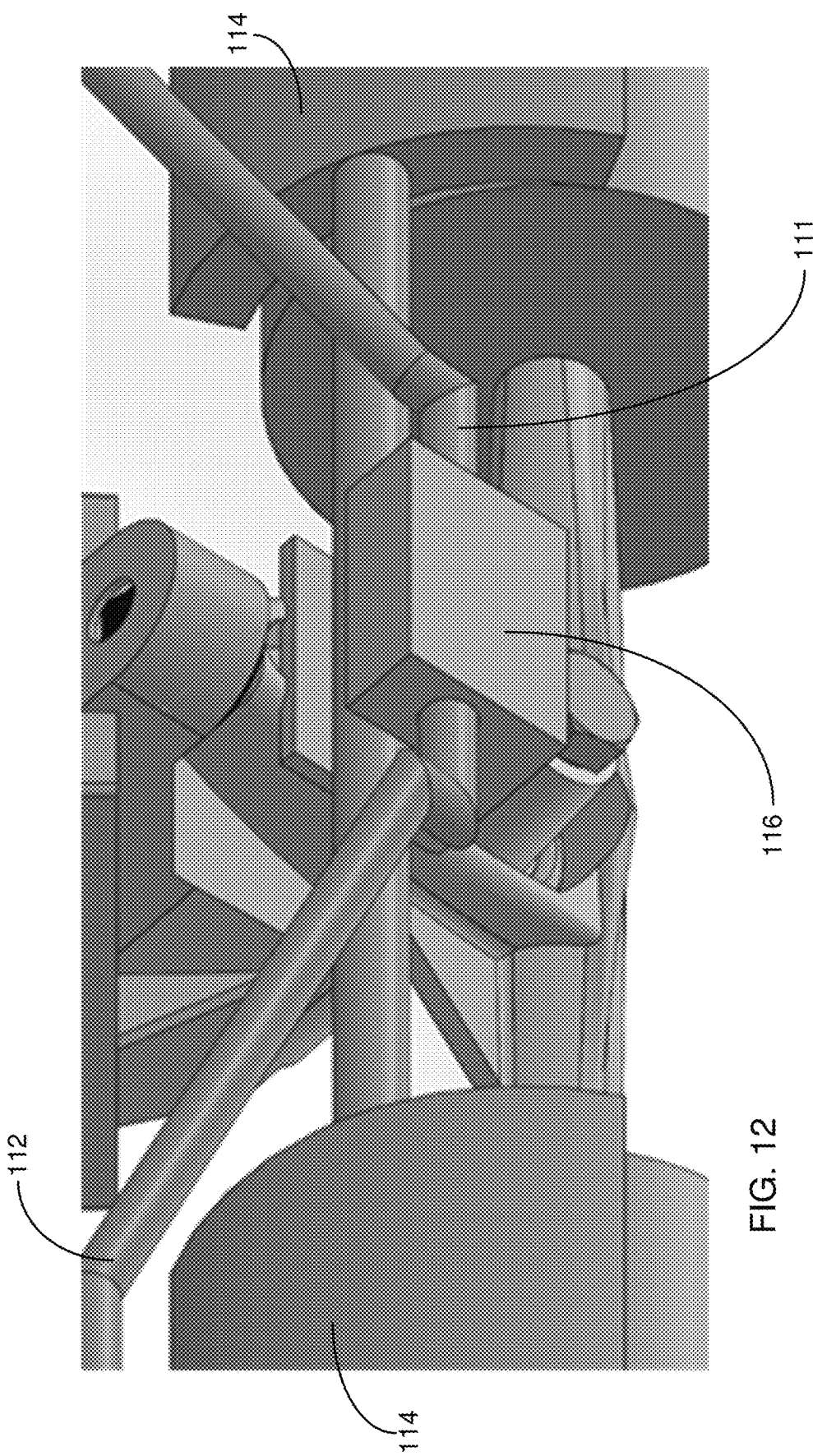
Figure 13:
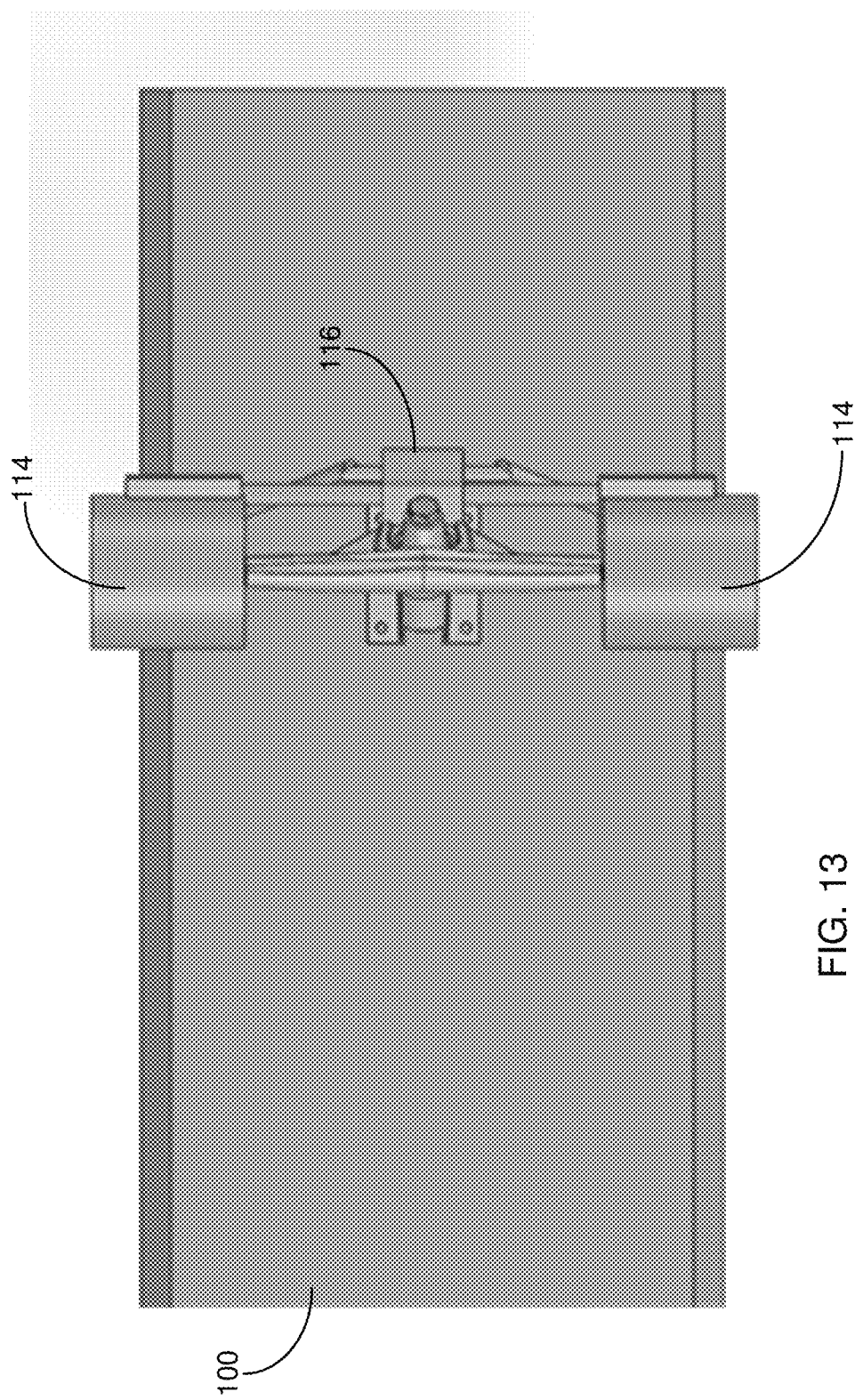

Referring to FIG. 3, the brake lever member 112 can have a lower surface or portion 111, angled portions 113 extending from the lower portion 111, curved portions 115 extending from the angled portions 113, and a foot pedal 117. As best shown in FIG. 12, the lower portion 111 can extend through the bore 120 in the alignment compartment 116. As best shown in FIG. 11, the angled portions 113 can extend away from the alignment compartment 116 and the curved portions 115 can extend around the sides of the longboard 100. The foot pedal 117 is attached to the end of one of the curved portions. In certain embodiments, a pedal 117 can be attached to the ends of either or both of the curved portions 115.

When the brake assembly 110 is attached to the longboard 100, the foot pedal 117 can be positioned just above the board 100 near the side such that a user can comfortably use their foot to apply pressure to the pedal 117 while in a riding position to apply the brakes to the wheels of the rear truck, as disclosed herein. Because the pedal 117 is attached to the curved portions 115 that extend around the board 100, the pedal can rest in a natural position without the need to drill any holes or make other modifications to the board. In some embodiments, the foot pedal 117 can rotate in order to ensure proper contact with a user's shoe. In some embodiments, the brake lever member 112 can be adjustable to fit different sized longboards. In other embodiments, the brake lever member 112 can be manufactured in a variety of sizes to fit different sized longboards.

Figure 5:
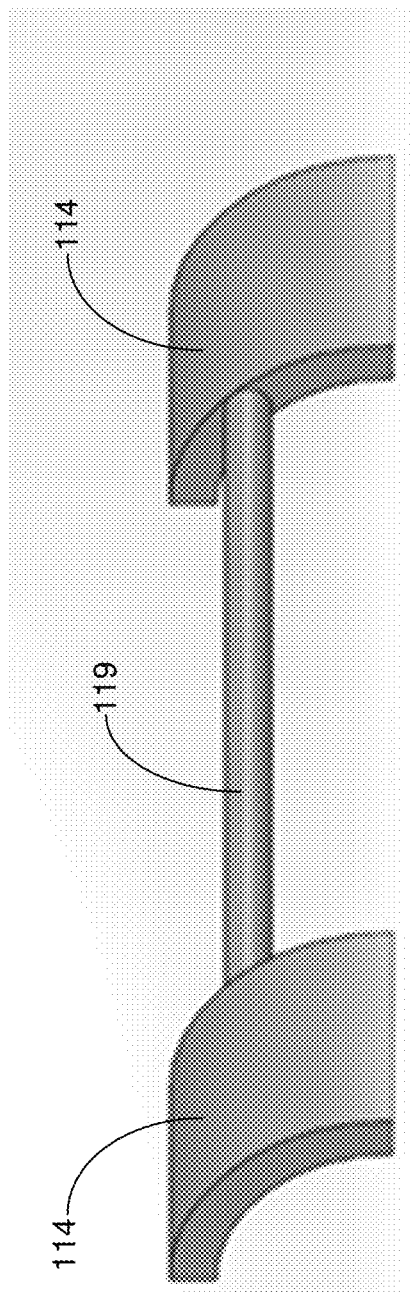
FIGS. 5-6 show an exemplary brake pad, according to one embodiment.
Figure 6:
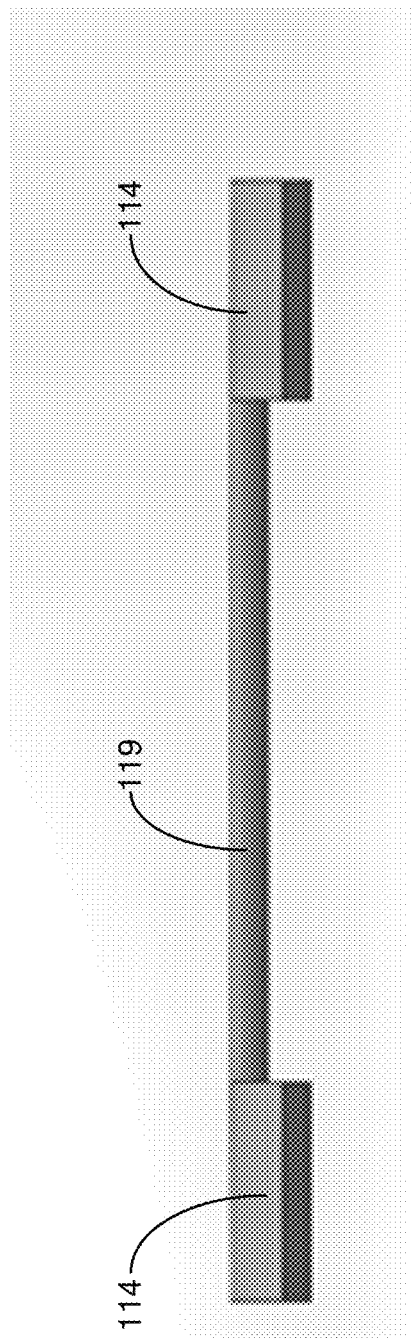

The brake pads 114 can be connected to a bar or member 119 that extends between the two brake pads, as best shown in FIGS. 5 and 6. The bar 119 can be placed within the U-shaped opening 118 of the alignment compartment 116, as best shown in FIG. 11. The bar 119 can be sized such that when it is placed within the U-shaped opening 118, the brake pads 114 are aligned with the wheels 124 of the longboard 100. In certain embodiments, the brake pads 114 can be curved to conform to the shape of the wheels 124 to increase surface area contact and create additional friction with the wheels when the brakes are applied. In some embodiments, the brake pads 114 can be removed from the bar 119 and replaced as they wear out. The springs 122 within the U-shaped opening 118 can apply upwardly-directed force to the bar 119, keeping the brake pads 114 in a first, unapplied, or natural position away from the wheels 124.

Figure 9:
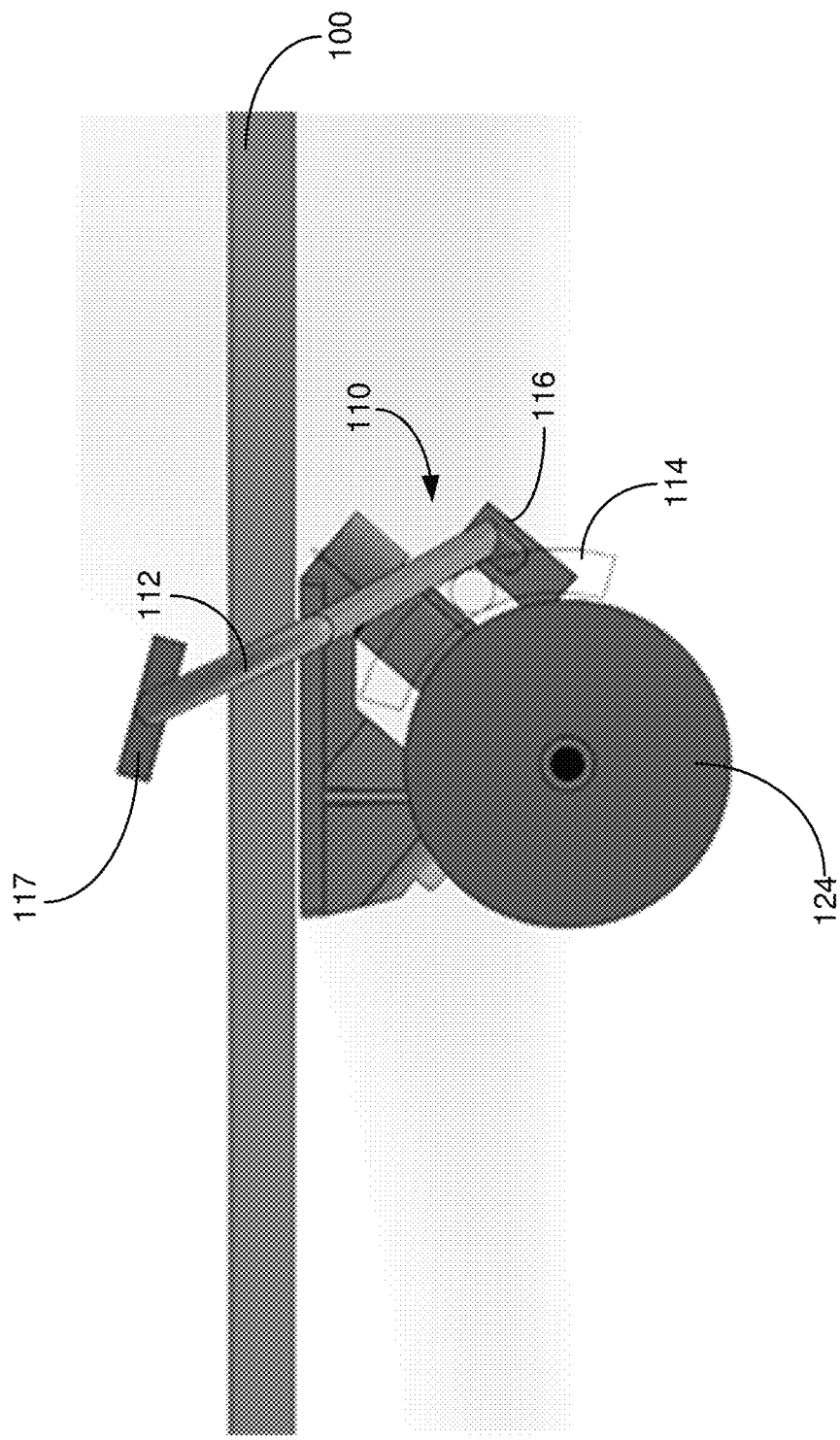
FIG. 9 shows the exemplary brake assembly of FIG. 2 on a longboard in a non-braking position.

FIG. 9 shows a side view of the longboard 100 and the brake assembly 110 in a first or resting position when the brake is not applied. Referring to FIG. 9, the brake pad 114 is positioned away from, and is not touching, the wheel 124. Because the brake pad 114 is coupled to the alignment compartment 116, which is connected to the hanger 106 (FIG. 8), the hanger, the alignment compartment, and the brake pad can all rotate or pivot together if a rider executes a turn on the board. This can prevent the brake pads 114 from inadvertently contacting the wheel 124 when the board 100 is turned (also known as "wheel bite").

Figure 10:
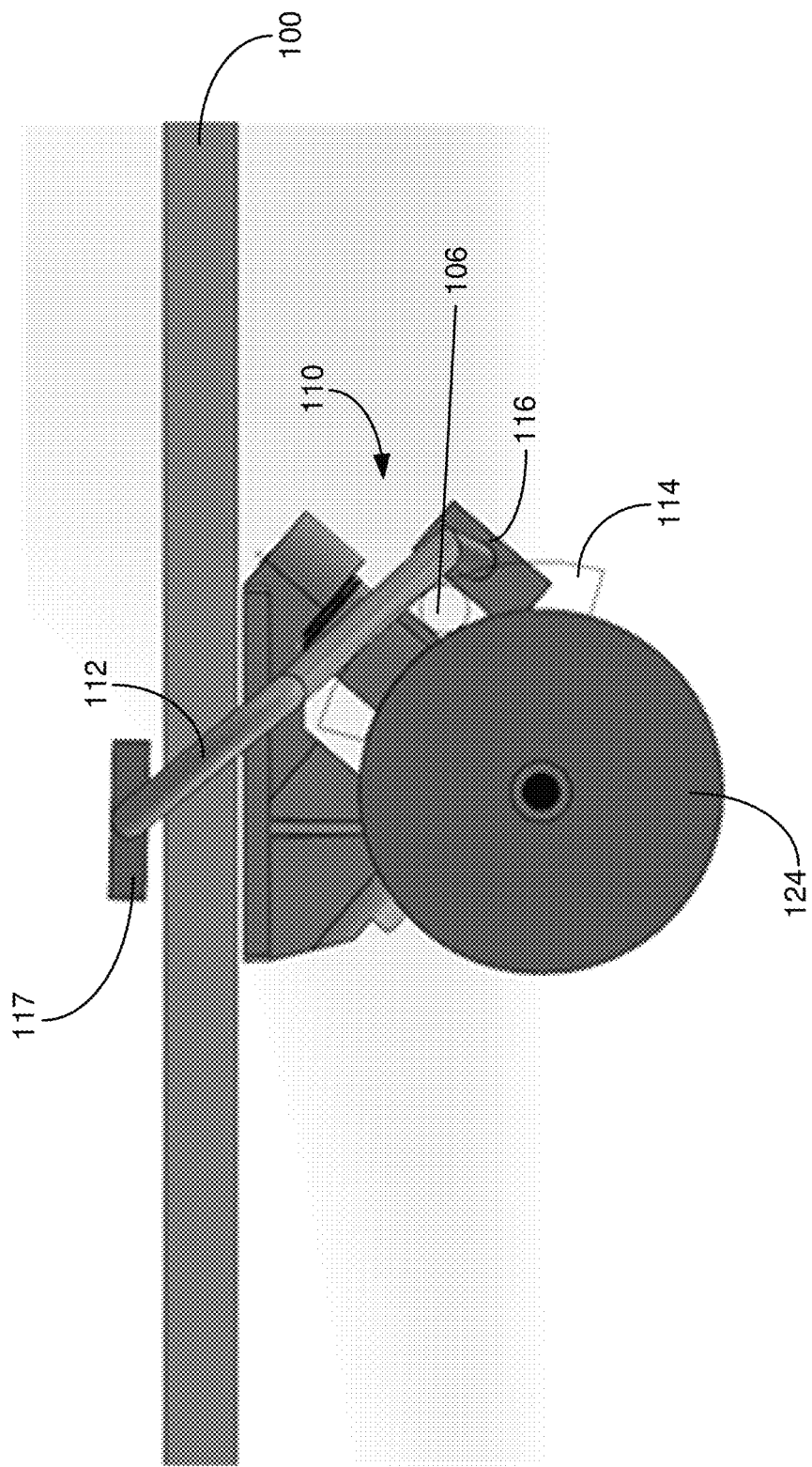
FIG. 10 shows the exemplary brake assembly of FIG. 2 on a longboard in a braking position.

FIG. 10 shows a side view of the longboard 100 and the brake assembly 110 in a braking position when the brake is applied. Referring to FIG. 10, the foot pedal 117 has been pressed to a second position. This causes the brake lever member 112 to pivot, thereby causing the angled portions 113 (FIG. 3) to press against the member 119 (FIG. 5) and/or against the brake pads 114. This causes the brake pads 114 to move downwardly through the U-shaped opening 118 and contact the wheels 124, thereby slowing or braking the longboard 100. As the brake lever member 112 is pressed against the bar 119, the springs 122 can be compressed, thus creating a slight resistance against the movement of the brake pads. This can allow the brake pads 114 to be applied more smoothly, creating a smoother braking experience and allowing a user to gradually decelerate by placing incremental amounts of pressure on the pedal 117. When pressure on the pedal 117 is released, the spring members can bias the assembly back to the first position.

Figure 16:
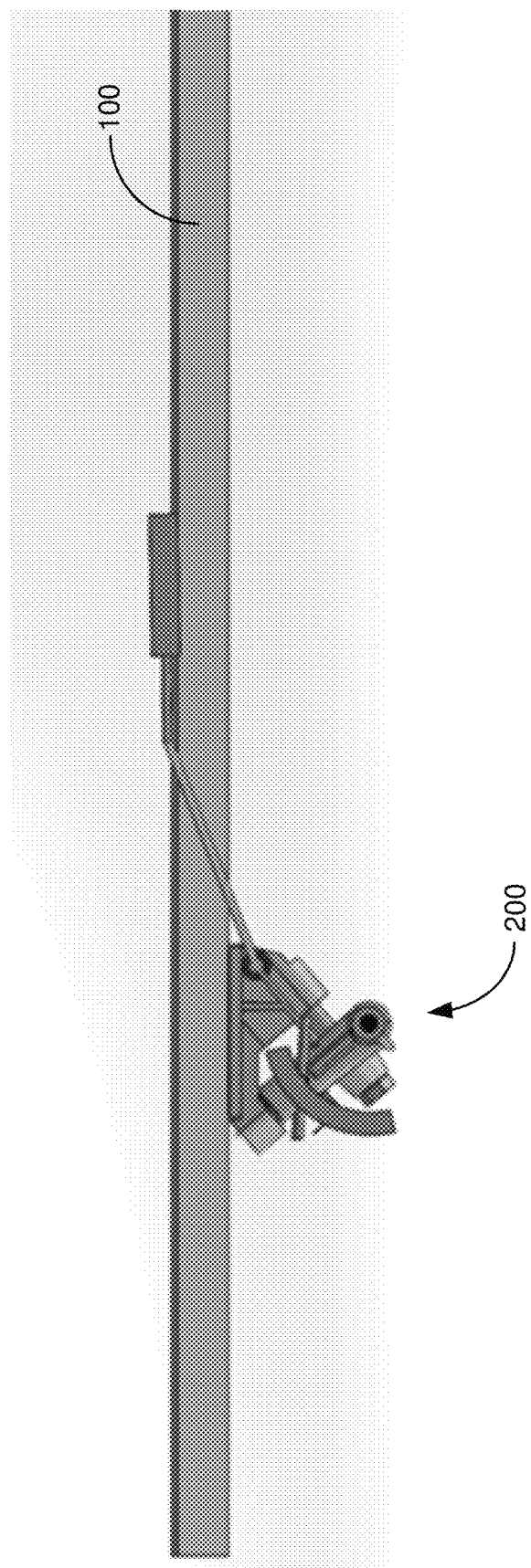
FIG. 16 shows another exemplary brake assembly for a longboard.

FIG. 16 shows another exemplary brake assembly 200. In certain embodiments, the brake assembly 200 can be incorporated into the rear truck of the longboard 100. The brake assembly 200 has two ball bearings in the base plate of the truck that guide the rotation of the pedal. The assembly 200 has two lever arms. The brake pedal is a part of the first lever arm which is a class 1 lever. When the pedal is pushed down, the other end of the lever is pushed up and makes contact with the second lever arm which is also a class 1 lever. When lever 2 is pushed up, the other side of lever 2 pushes down on the brake pads which in turn make contact with the wheels. When the brake pedal is not being pushed down by the rider, four springs push up on the bar that connects the two brake pads, ensuring that there is no contact between the brake pads and the wheels. This assembly 200 can have the same curved brake pads 114 as brake assembly 110. The brake pads 114 of the assembly 200 can be connected to the hanger to avoid "wheel bite." The brake pedal of the assembly 200 does not go through the board 100. The assembly 200 can also comprise springs to push the brake pads back to their original position.

FIGS. 17A-17F illustrate another exemplary embodiment of a brake assembly 300. The brake assembly 300 can be incorporated into the rear truck of a longboard, such as rear truck 104 (including hanger 106 and axle 108) of longboard 100 described above. The brake assembly 300 can be movable between a first or unapplied position and a second or applied position. When in the applied position, the brake assembly 300 can engage one or more wheels 124 of the longboard 100, thereby slowing or braking the longboard 100.

The brake assembly 300 can generally comprise one or more flanges configured as mounting members/mounting portions/coupling portions/attachment portions referred to herein as raised anchors 302, one or more brake levers 304 (FIG. 19), a linkage assembly comprising a first tensioning member 306 which in this case is a connection cable and a second tensioning member 312 which in this case is a pedal cable, an actuator member configured as a pedal assembly 308 (see e.g., FIG. 24), a housing 314, and/or a cable carrier member or cable anchor 316. In certain embodiments, the brake assembly 300 can be coupled to the rear truck 104 in the following exemplary manner.

In some embodiments, the components of the brake assembly 300 can be provided as an assembly or kit and can be packaged together for delivery to the end user. An exemplary kit can comprise two or more anchor members 302, two or more brake lever members 304 including one or more brake pads 330, a linkage assembly including two or more tensioning members (e.g., tensioning members 306 and/or 312), a housing 314, and a pedal assembly 308. A user can purchase the brake assembly kit separately from a longboard or skateboard and can couple the brake assembly 300 to the longboard or skateboard themselves. Such a kit advantageously allows a user to add a brake assembly to an existing longboard or skateboard and/or allows a user to, for example, transfer the brake assembly 300 from one board to another.

Figure 19:
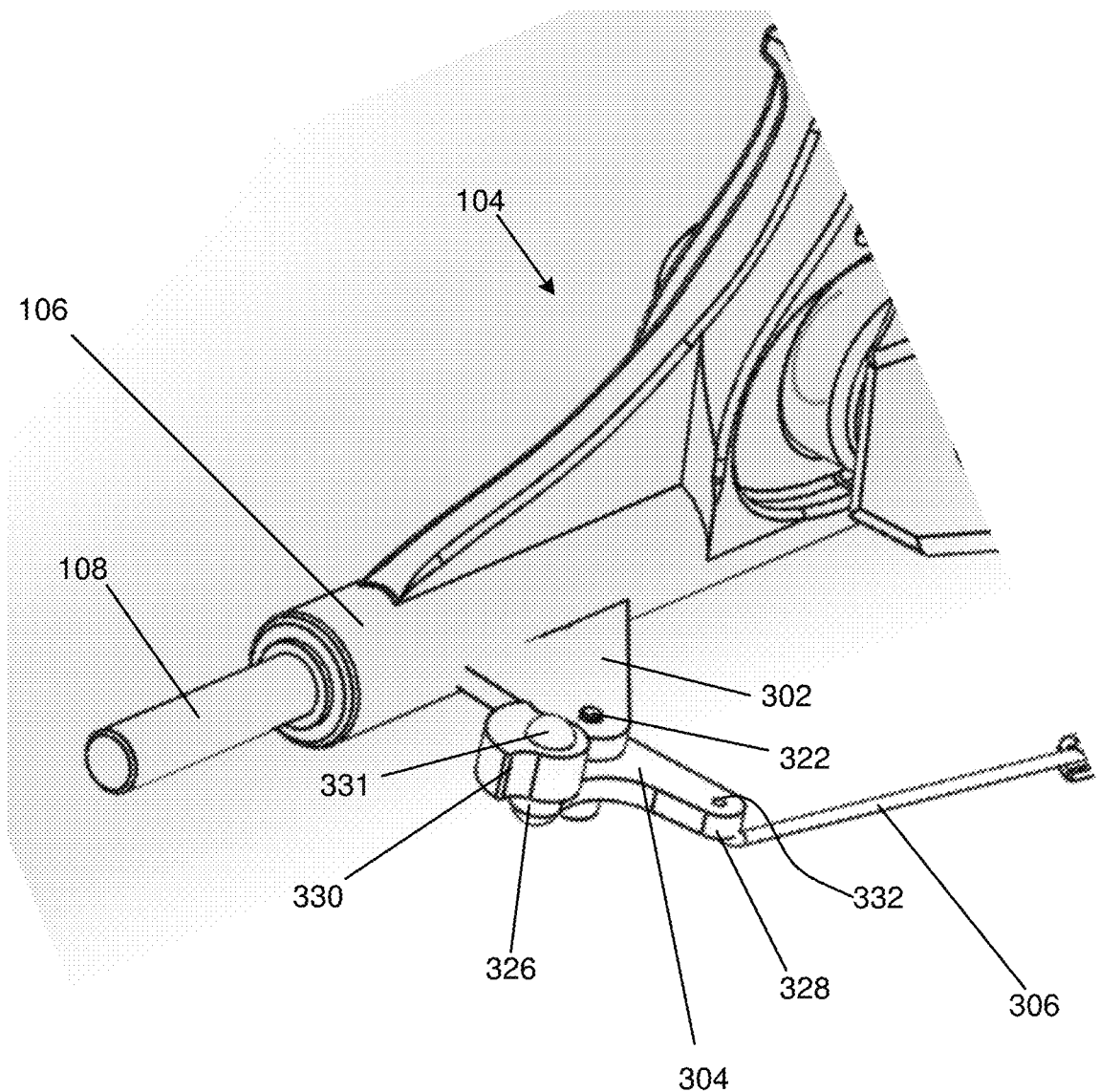
FIG. 19 is a perspective view of a portion of the brake assembly of FIG. 18.
Figure 20:
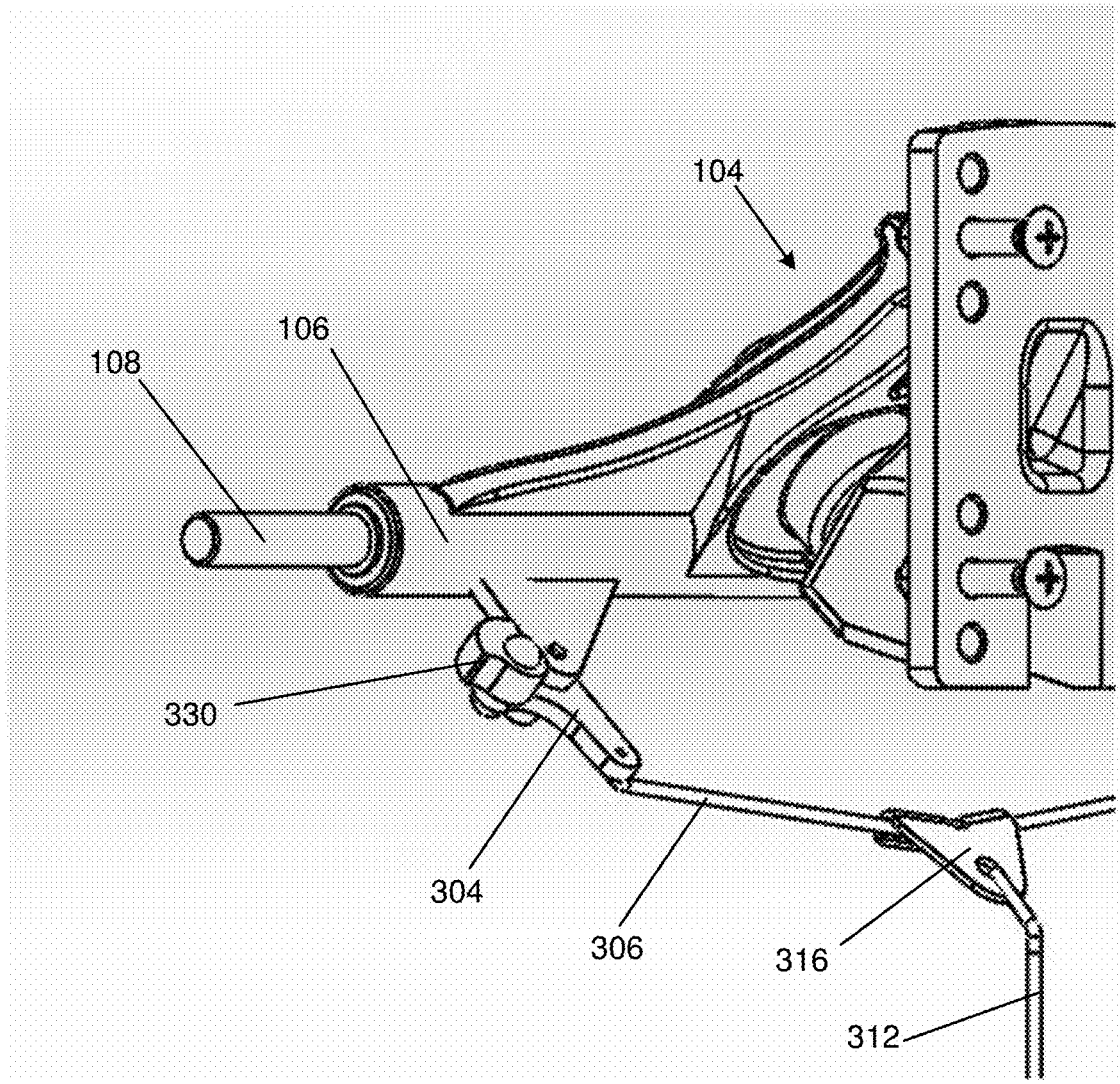
FIG. 20 is a perspective view of a portion of the brake assembly of FIG. 18.
Figure 21:
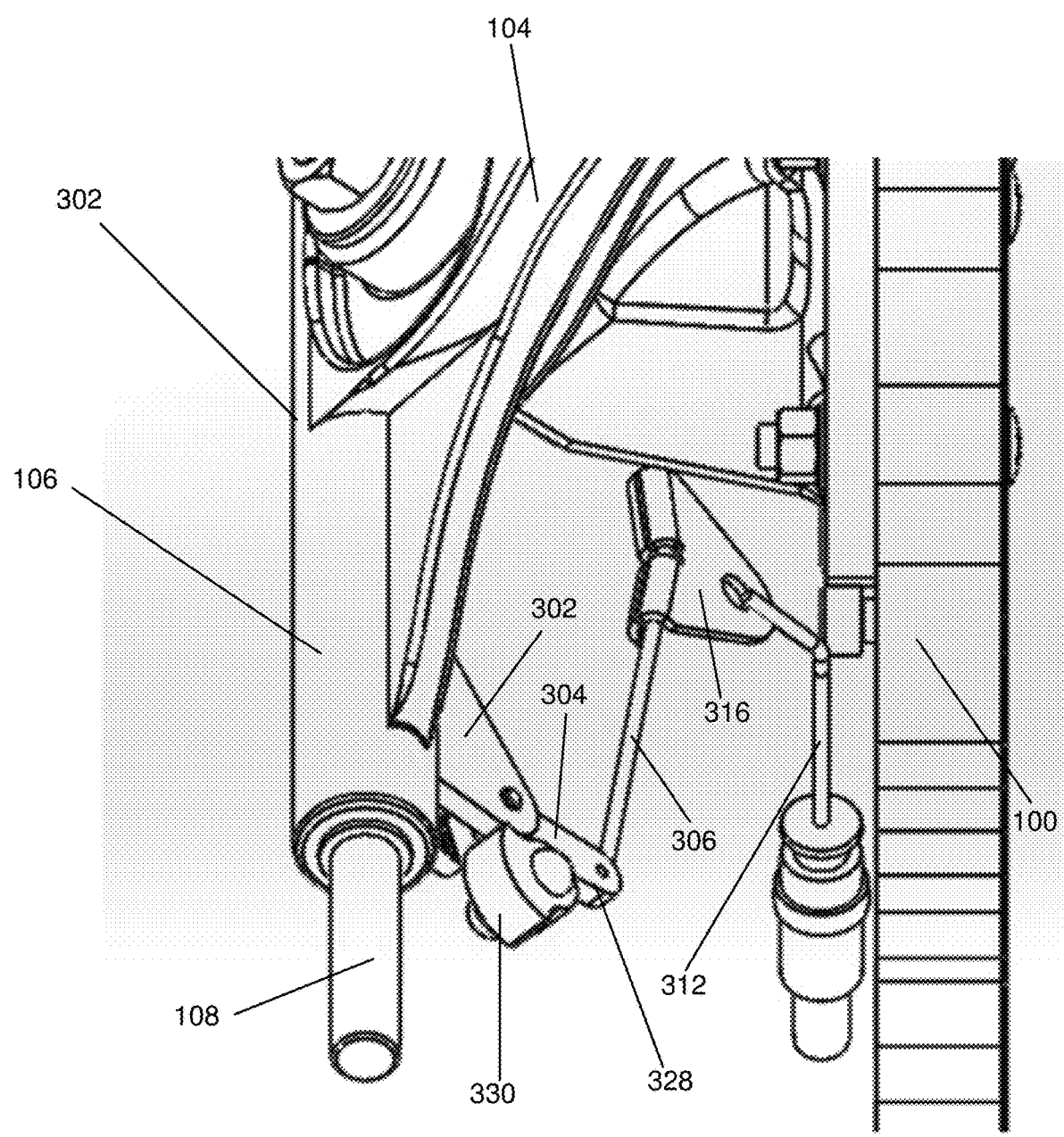
FIG. 21 is a perspective view of the brake assembly of FIG. 18.
Figure 22:
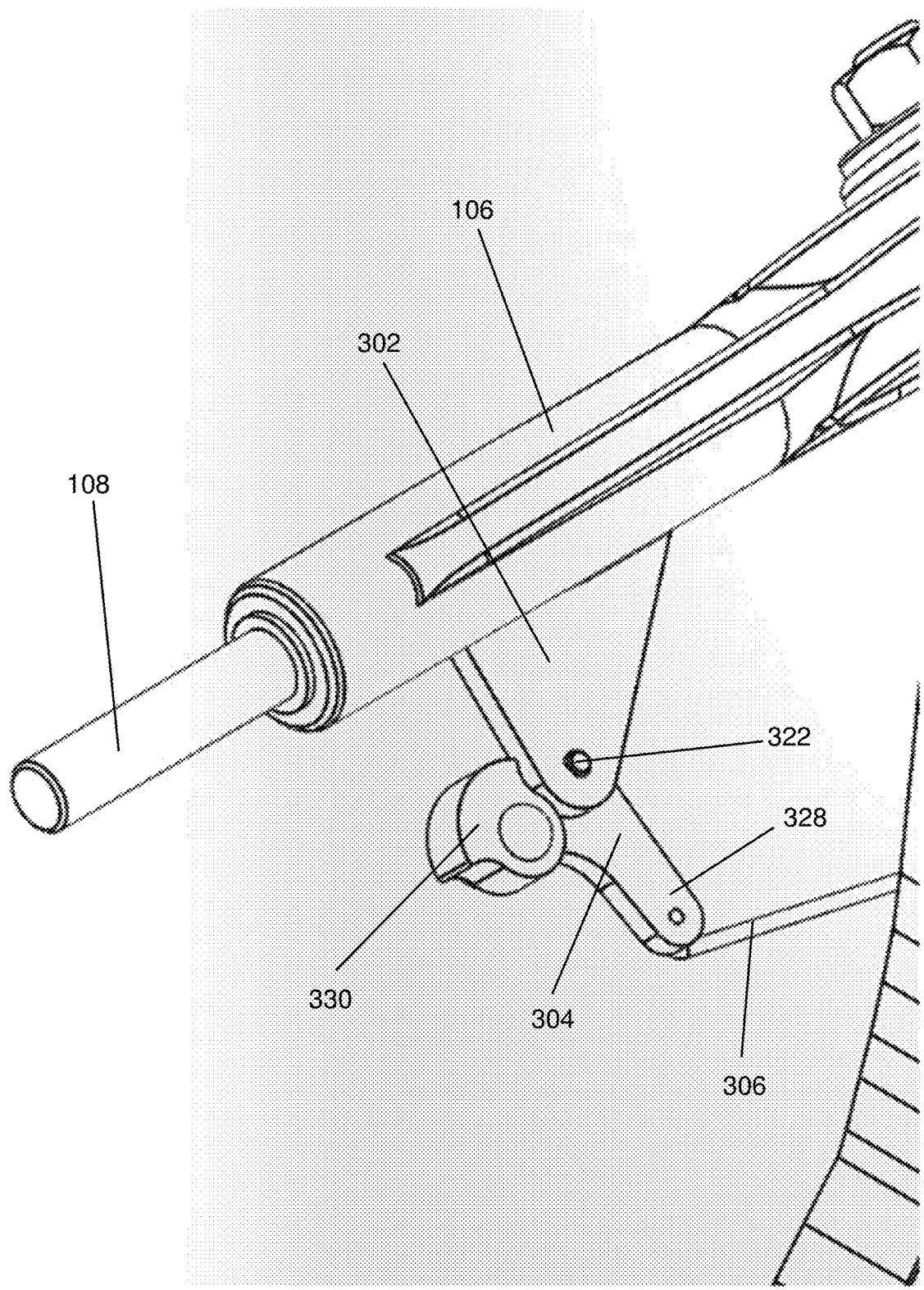
FIG. 22 is a perspective view of the brake assembly of FIG. 21.
Figure 24:
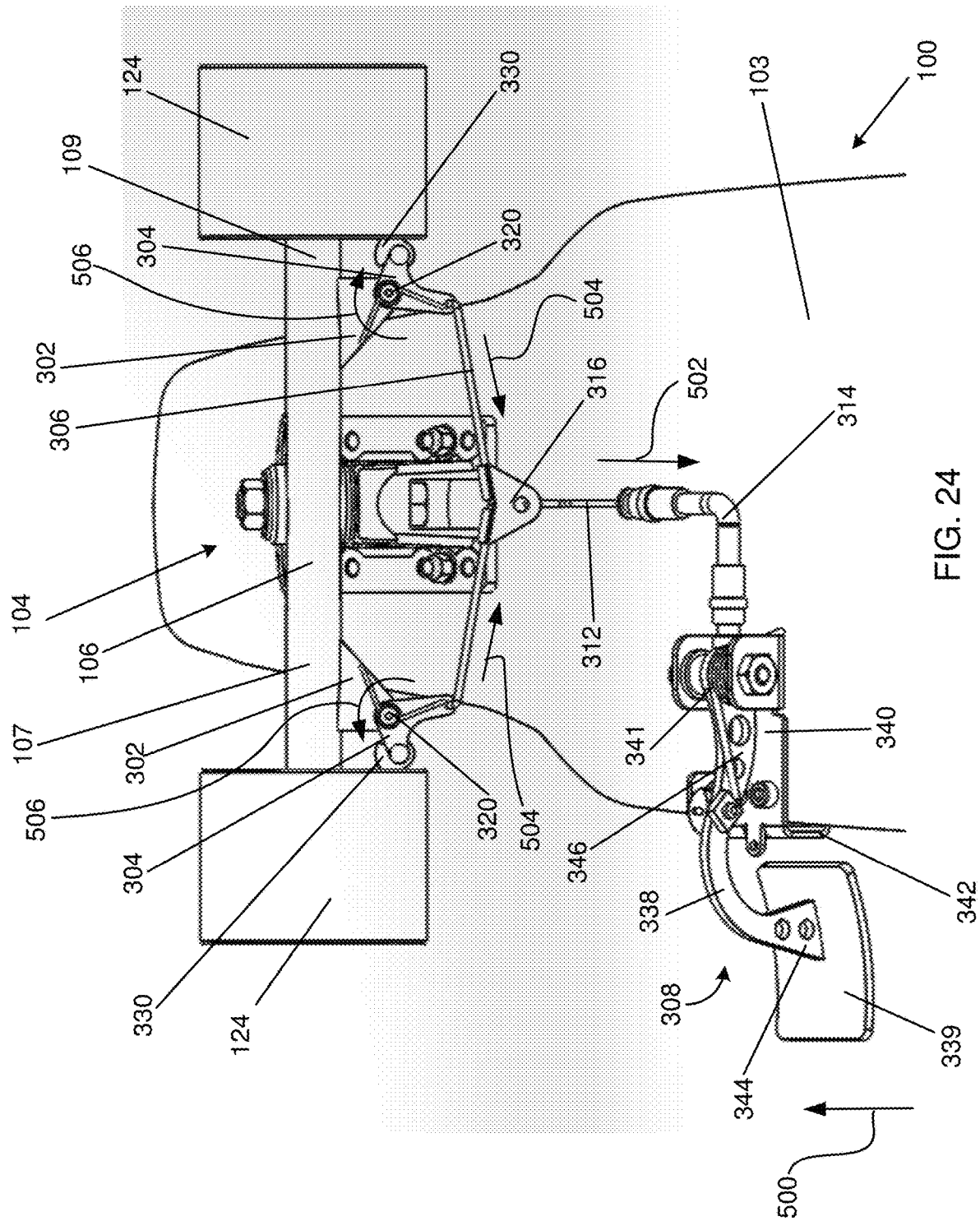
FIG. 24 is a perspective view of an exemplary brake assembly, according to another embodiment.
Figure 25:
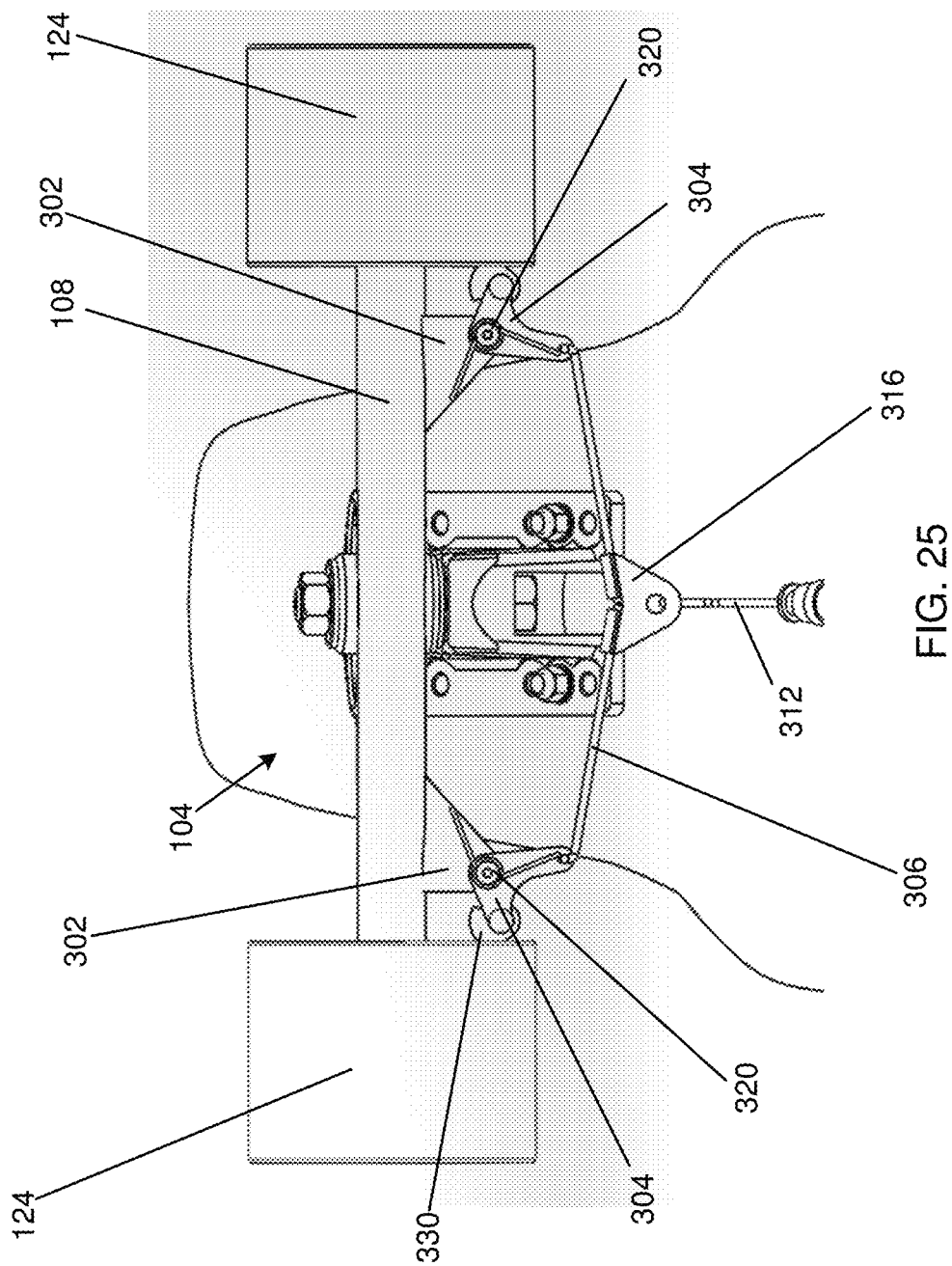
FIG. 25 is a bottom plan view of a portion of the exemplary brake assembly of FIG. 24.
Figure 33:
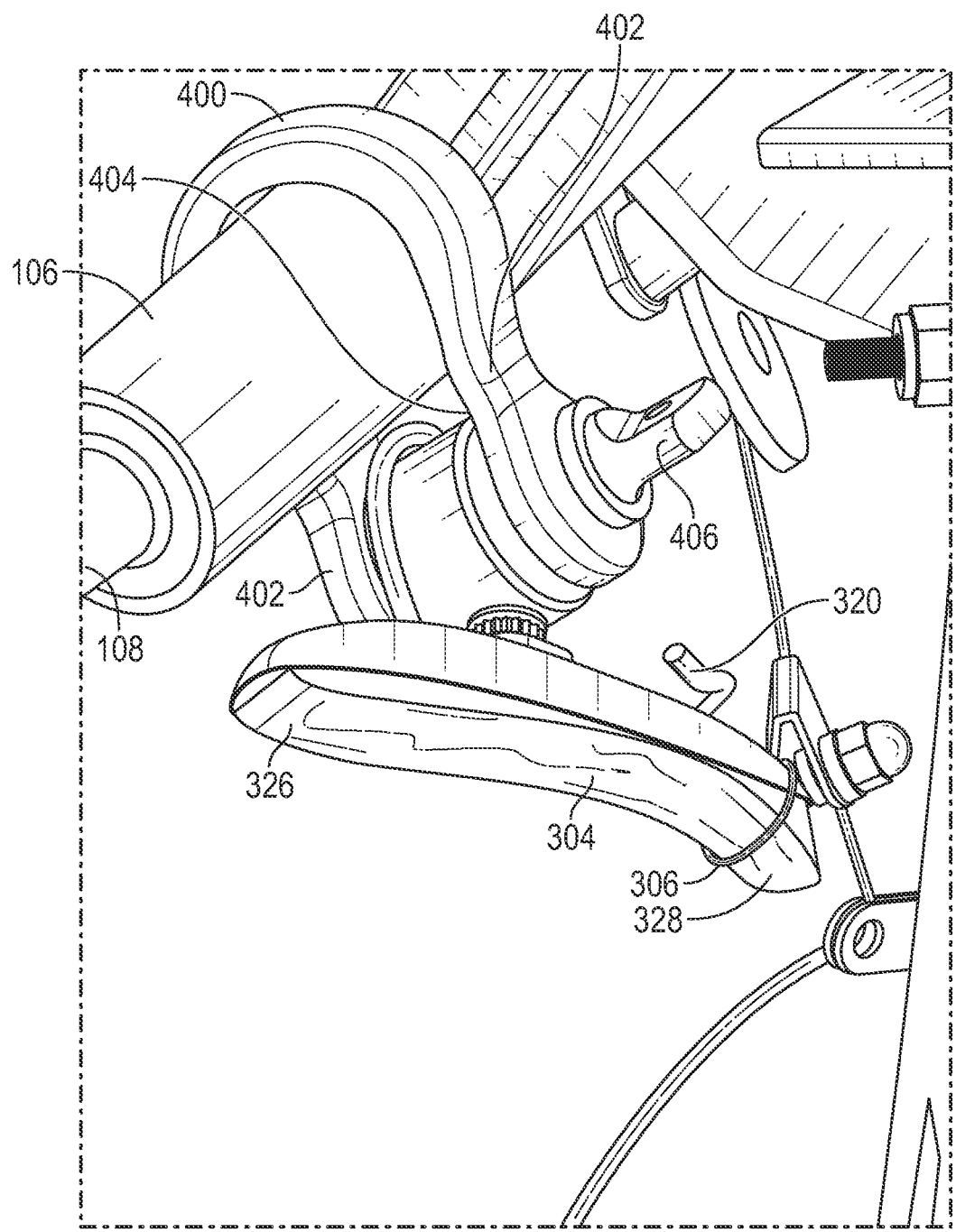
FIG. 33 is a perspective view of a portion of an exemplary brake assembly for a longboard, according to another embodiment.

Referring to FIG. 17A, a raised anchor 302 can be disposed at either/both sides/end portions of the cylindrical portion 101 of the hanger 106 such that they are adjacent the wheels 124. For example, in the illustrated embodiment, as shown in FIG. 24, a respective raised anchor 302 is disposed on a first end portion 107 and a second end portion 109 of the hanger 106. As seen in FIG. 19, each anchor member 302 can be, for example, a triangularly shaped member or flange that extends from an outer surface of a cylindrical portion of the hanger 106 through which the axle/shaft 108 extends. In other embodiments, such as shown in FIG. 33, the anchor members 302 can be configured as u-shaped clamp members comprising a pair of arms defining a channel between them and each arm comprising an opening or aperture. The anchor members and associated arms can be coupled or attached to the hanger or other portions of the truck, or integrally formed with the hanger or other portions of the truck. As used herein, "integrally formed" refers to a construction that does not include any welds, fasteners, or other means for securing separately formed pieces of material to each other. In some embodiments, the anchor members 302 can be removably coupled to the hanger 106. For example, in some embodiments, each anchor member 302 can comprise a securing member extending around the hanger 106 that can be tightened to secure the anchor member 302 to the hanger 106 and loosened to remove or reposition the anchor member 302.

Figure 18:
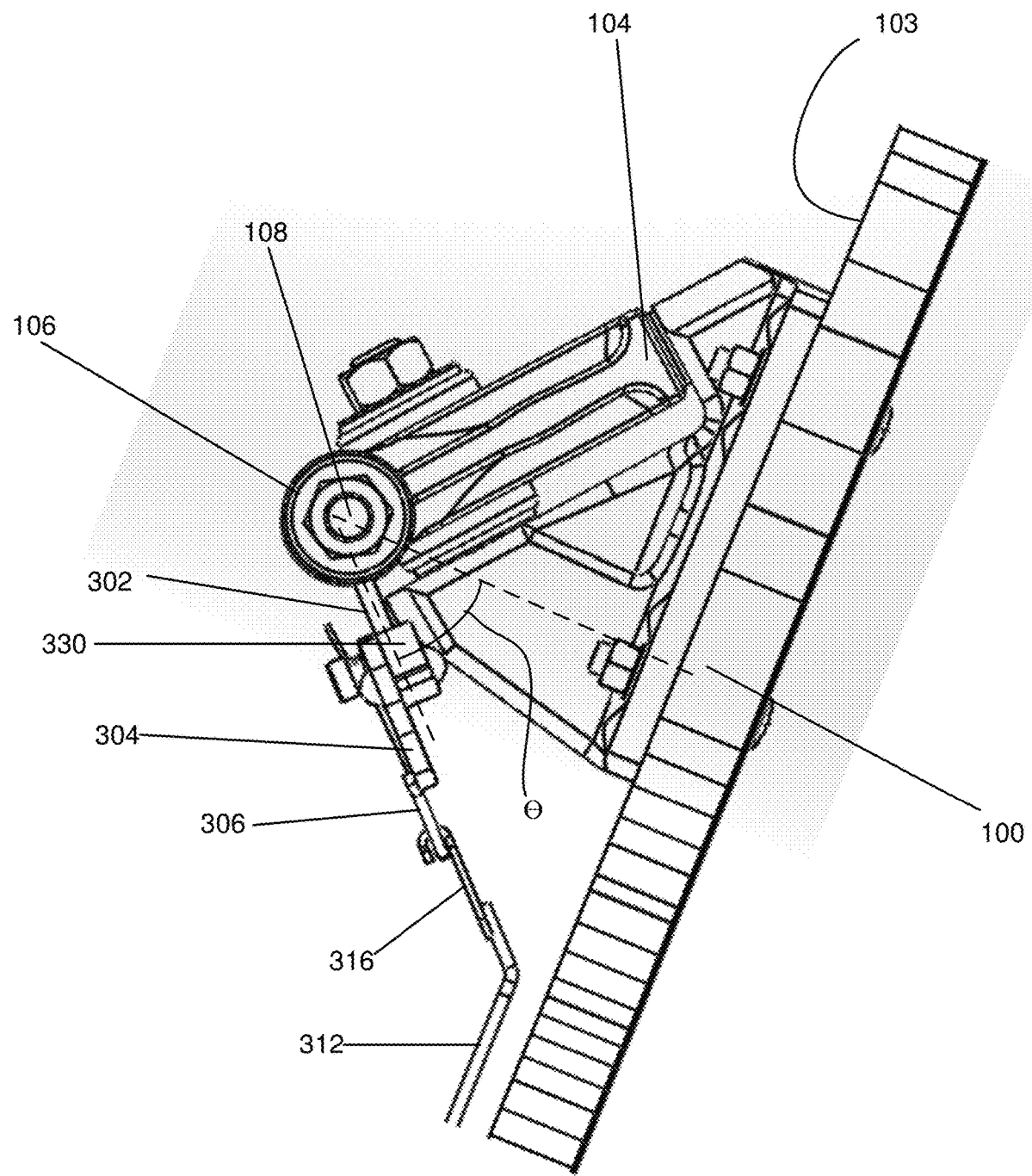
FIG. 18 is a perspective view of a portion of an exemplary brake assembly for a longboard, according to another embodiment.

In some embodiments, such as the embodiment shown in FIGS. 18-25, each end of the hanger 106 comprises a raised anchor 302. Referring to FIG. 18, each raised anchor 302 can extend from the hanger 106 at an angle θ toward the underside 103 of the longboard 100 and toward the front truck 102. This configuration advantageously reduces the distance across which the tensioning member 306 of the linkage assembly must extend to connect the brake levers 304 to the pedal assembly 308. This configuration also advantageously holds the tensioning member 306 close to the underside 103 of the longboard, which can prevent or mitigate the tensioning member 306 from snagging on objects and also minimize the profile of the brake assembly 300. In other embodiments, the raised anchors 302 can be positioned at different locations and/or at different angles relative to the hanger 106 and/or the axle 108. For example, in some embodiments the raised anchors 302 can be disposed closer to or further from the wheels 124 and the function of the brake assembly 300 can remain the same by varying the length of the brake lever 304. Because the raised anchors 302 and brake levers 304 are coupled to the hanger 106 of the rear truck 104 (which remains perpendicular to the wheels 124 during turning), the brake levers 304 are prevented from inadvertently contacting the wheel 124 when the board 100 is turned (wheel bite). As mentioned previously, the raised anchors 302 can be positioned on the hanger 106 at an angle θ relative to a plane extending perpendicularly to a longitudinal axis of the longboard 100 or perpendicular to the upper and/or lower surfaces of the board, which prevents and/or mitigates the raised anchors 302 from contacting the longboard 100 during turning, thereby mitigating the risk of wheel bite. The angle θ can be between 0 degrees and 90 degrees. In particular embodiments, the angle can be between 10 degrees and 80 degrees, 20 degrees and 60 degrees, 30 degrees and 60 degrees, between 0 degrees and 15 degrees, between 15 degrees and 30 degrees, between 30 degrees and 45 degrees, between 45 degrees and 60 degrees, between 60 degrees and 75 degrees, or between 75 degrees and 90 degrees. This advantageously allows a user to turn the longboard without inadvertently applying the brake assembly 300. Furthermore, the brake assembly 300 uses a linkage assembly (including first tensioning member 306 and second tensioning member 312 (see, e.g., FIG. 24)) to couple the brake levers 304 to the pedal assembly 308. The flexibility and positioning of the tension members means that they are not affected by the turning motion of the longboard 100.

Referring now to FIG. 19, in the illustrated embodiment, each brake lever 304 has a curved shape including a first end portion 326 and a second end portion 328. The brake lever 304 can be coupled to the raised anchor 302 via a fastener 322 (e.g., a screw or bolt), which can extend through an opening 334 (see e.g., FIG. 23) in the body of the brake lever 304. The first end portion 326 can include a brake pad 330 and can also be referred to as the "brake pad arm." The brake pad 330 can be removably coupled to the first end portion 326 via an additional fastener 331. The brake pad 330 and fastener 331 can be configured such that the brake pad 330 can be easily removed and/or replaced when/if the brake pad becomes worn. The second end portion 328 can include an aperture 332 and can also be referred to as the "connection arm." The tensioning member 306 can be coupled to the connection arm 328, as shown in FIG. 19.

As best seen in FIG. 24, each brake lever 304 can be coupled to a respective biasing member 320 (e.g., a spring such as a torsion spring). The biasing member 320 can be configured to bias the brake lever 304 and thereby the brake pad 330 away from the wheel 124. When the tensioning member 306 is actuated (e.g., pulled and/or placed in tension), the brake lever 304 rotates about the fastener 322, causing the brake pad 330 to contact an inner surface 123 of the wheel 124 (see e.g., FIG. 17E), creating friction and slowing or stopping the rotation of the wheel 124. When tension in the tensioning member 306 is released/relieved, the biasing member 320 (FIG. 24) biases the brake pad arm 326 away from the inner surface 123, allowing the wheel 124 to rotate freely.

In other embodiments, the brake lever 304 can have any of various shapes (e.g., a C-shape, an L-shape, etc.), and there can be any of various angles between the brake pad arm 326 and the connection arm 328. For example, FIG. 33 illustrates another embodiment wherein the brake lever 304 has an elongated, slightly curved shape.

Figure 23:
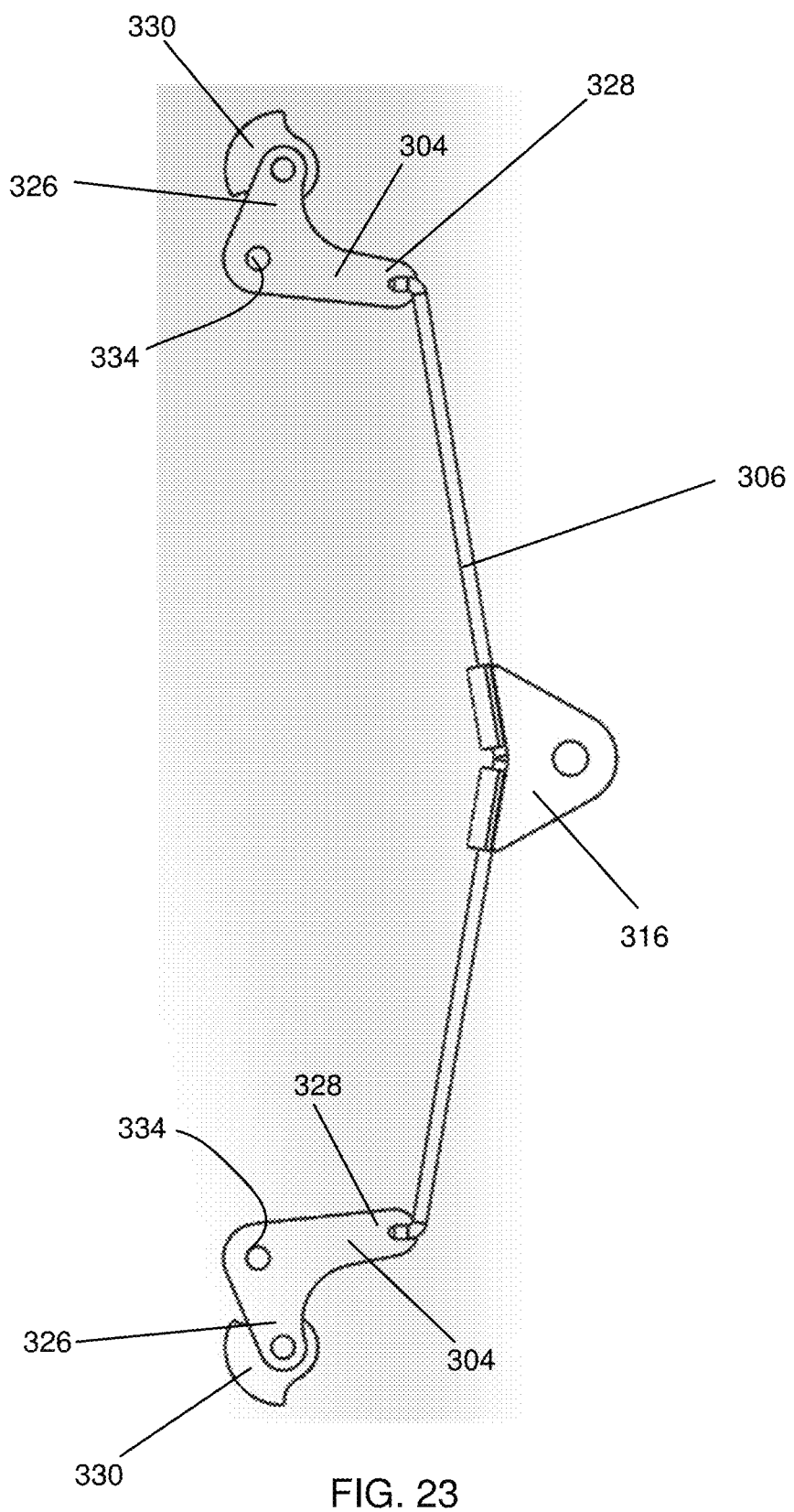
FIG. 23 is a side view of an exemplary set of brake levers including brake pads.

In the illustrated embodiment, the brake assembly 300 comprises two brake levers 304, each coupled to a respective raised anchor 302. As shown in FIG. 23, each brake lever 304 can be coupled to the tensioning member 306 of the linkage assembly. The tensioning member 306 can be configured as a connection cable comprising an elongated flexible member such as a wire, a braided non-metallic fiber, or any other similar material that can be threaded through or coupled to the connection arms 328 and placed in tension to actuate the brake levers 304. Referring now to FIG. 24, the tensioning member 306 can be threaded through a cable anchor 316, such as a T-bar, coupled to the underside 103 of the longboard 100. The cable anchor 316 can have hooked portion or bore through which the tension member extends. In other embodiments, the tensioning member 306 can be coupled to the cable anchor 316.

The brake assembly 300 can further comprise a tensioning member configured as a pedal cable 312 coupled to the tensioning member 306. The pedal cable 312 can have a first end portion 336 coupled to the tensioning member 306 via the cable anchor 316 and can be configured to apply a force (e.g., a pulling force as shown by arrows 504 in FIG. 24) to the tensioning member 306 in order to place the connection cable 306 in tension and thereby actuate the brake levers 304 causing them to engage the wheels 124 (e.g., as shown by arrows 506 in FIG. 24). In some embodiments, such as the illustrated embodiment, the pedal cable 312 can extend through a housing 314. The housing 314 can be, for example, a flexible or rigid tube, and the pedal cable 312 can move freely within the housing 314. In some embodiments, the housing 314 can be coupled to and extend from a portion of the brake pedal. In other embodiments, the housing 314 can be coupled to the underside 103 of the longboard 100 via one or more cable clips. The cable clips can be coupled to the longboard using any of various methods, for example, adhesives or mechanical fasteners such as screws, etc. The pedal cable 312 can have a second end portion coupled to a pedal assembly, for example, pedal assembly 308. In the illustrated embodiment, the housing 314 can comprise a bend to route the cable 312 from the pedal assembly 308 positioned at the side of the longboard along the center of the longboard toward the rear truck.

As shown in FIGS. 26-31, the pedal assembly 308 can comprise a lever arm having an extension portion or member 338, a pedal 339 coupled to the extension member 338, a support portion/member/bracket 340, and a clamp 342 that couples the extension and support portions 338, 340 to the longboard 100. The pedal assembly 308 can further comprise a biasing member 341 (see FIG. 24), such as a torsion spring, configured to bias the pedal assembly 308 into the unapplied position. Referring to FIG. 27, the extension member 338 can have a first end portion 344 coupled to the pedal 339 and a second end portion 346 directly or indirectly coupled to the pedal cable 312. The first end portion 344 can be positioned such that a user can actuate it via pressing the pedal 339 with their foot. In order to move the brake assembly 300 into the applied position, the user must apply sufficient force to the pedal 339 to overcome the biasing force applied by the biasing member 341 and thereby depress the first end portion 344.

When the first end portion 344 of the extension member 338 is actuated (e.g., by pressing the pedal 339 downwards), the second end portion 346 is correspondingly actuated (e.g., by moving upwards), thus moving and/or tensioning the pedal cable 312. The pedal cable 312 then tensions the connection cable 306, which moves the brake levers 304 into the applied position, thereby engaging the wheels 124. Once the pedal assembly 308 is released, the biasing member 341 pushes the first end portion 344 back into the unapplied position.

In other embodiments, the pedal assembly 308 can have any of various shapes and configurations. For example, in some embodiments, the pedal assembly 308 can be configured as a hand brake and the user can, for example, crouch on the longboard in order to actuate the brake pedal by hand, depending upon the position of the handle. In other embodiments, rather than pressing down on the pedal assembly 308, the user can lift up the pedal 339 using, for example, their foot. In still other embodiments, the pedal assembly 308 can be actuated by rotating the extension member 338 towards the front end and/or the back end of the longboard 100.

Figure 28:
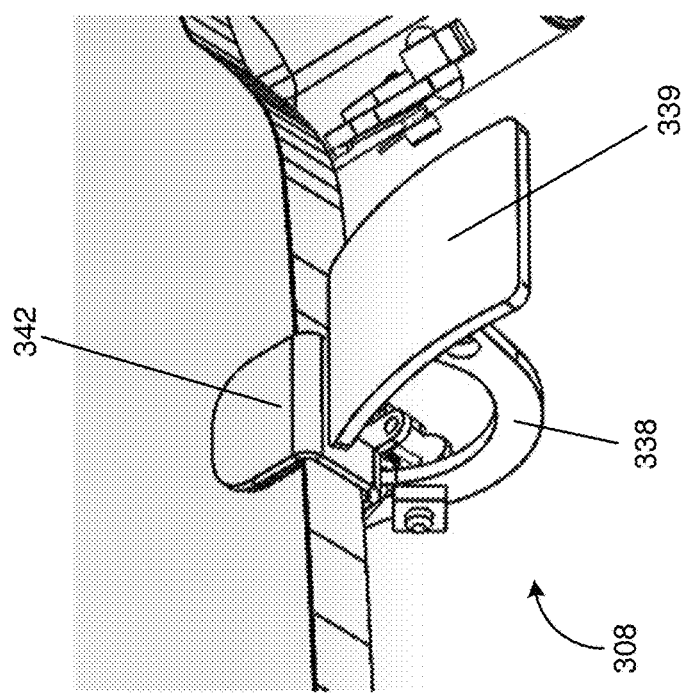
FIG. 28 is a perspective view of the brake pedal of FIG. 27.

Referring to FIG. 28, the clamp 342 can be a U-shaped member configured to releasably couple the support portion 340 (FIG. 30) and extension member 338 to the longboard 100. The clamp 342 can be coupled to the longboard via one or more fasteners (e.g., two fasteners) such as screws. The clamp 342 and fastener configuration can advantageously allow the pedal assembly 308 to be positioned at any location on the longboard 100 including on either side edge. The clamp 342 and fasteners can be adjusted to accommodate a variety of longboard thicknesses. Furthermore, the clamp 342 allows the pedal assembly 308 to be fully removed from the board, for example, if the user no longer wants the pedal assembly 308 on their longboard, or if the user temporarily wishes to remove the pedal assembly 308, for example, to perform tricks. The pedal assembly 308 can be removed and reattached as necessary, and the position of the pedal assembly 308 can be adjusted (e.g., for different users or user preferences).

In other embodiments, as shown in FIG. 32, the clamp 342 can be configured as, for example, one or more C-clamps, configured to releasably couple the pedal assembly 308 to the longboard 100. The C-clamps can be coupled to the board 100 by tightening the clamps (e.g., by rotating the screws 343). As shown in FIG. 32, in some embodiments, the clamps 342 can have soft/cushioned/padded portions 345 on the ends of the screws 343 to help ensure that the clamps 342 do not scratch or otherwise damage the surface of the longboard 100. In other embodiments, the clamps 342 can be any of various other types of securing elements or clamps (e.g., spring clamps or latches, frictionally or non-frictionally retained, fasteners extending through the board, adhesive, welds, etc.) configured to hold the pedal assembly 308 to the board 100. In certain embodiments, the mounting portion of the pedal assembly can be integrally formed with the board.

In some embodiments, the clamp 342 and the support portion 340 are formed integrally as one piece. However, in other embodiments, the clamp(s) 342 and the support portion 340 can be formed as separate pieces with the clamps 342 securing the support portion 340 to the longboard 100. In still other embodiments, the clamp 342 and the support portion 340 can be permanently or releasably coupled together using, for example, welding, adhesives, and/or mechanical fasteners such as screws.

Referring to FIG. 30, the support portion 340 can comprise one or more mounting portions configured as eyelets (e.g., two eyelets). An axle or member 350 (e.g., a fastener member such as a bolt) can extend through the eyelets, as shown in FIG. 31. The axle 350 can be secured relative to the eyelets (e.g., using a head portion 352 and/or one or more fasteners 354 such as nuts).

The biasing member 341 can be coupled to the axle 350. The biasing member 341 can be, for example, a torsion spring. An end portion of the biasing member 341 can be coupled to the extension member 338 such that the biasing member 341 can bias the pedal assembly 308 into the unapplied position.

Figure 29:
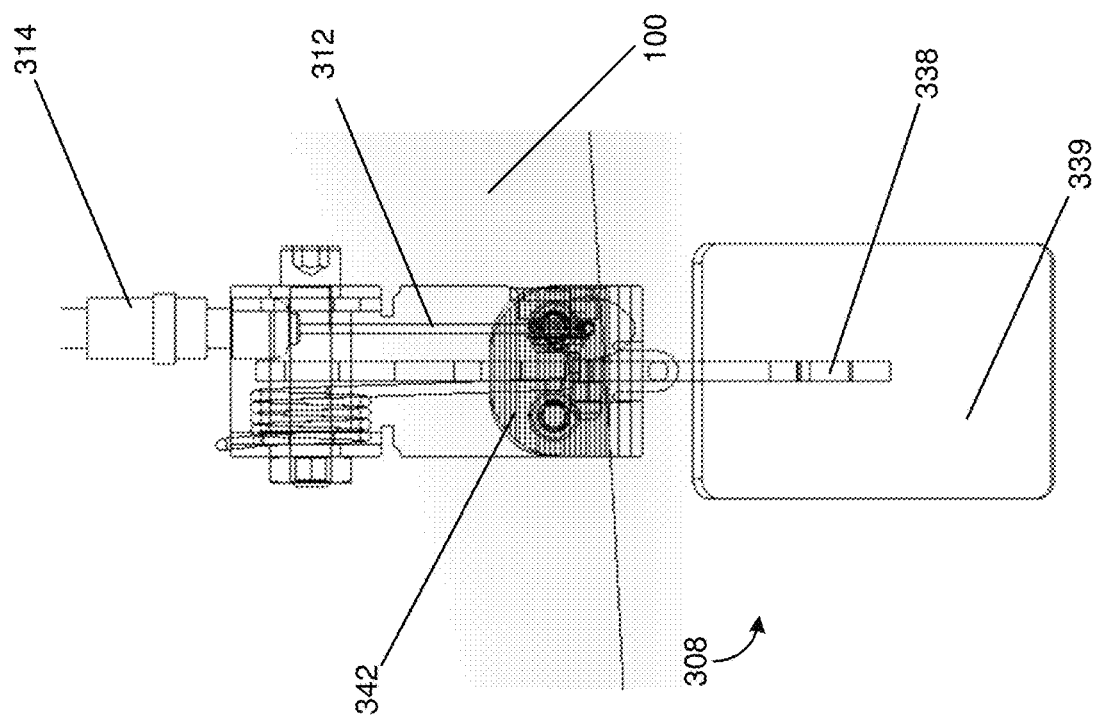
FIG. 29 is a top plan view of the brake pedal of FIG. 27.

The extension member 338 can be configured as a lever using the axle 350 as a pivot. As best seen in FIG. 29, the housing 314 can be coupled to the support portion 340 (FIG. 30), and the pedal cable 312 can extend through the housing 314 and be coupled to the extension member 338. In some embodiments, the support portion 340 and housing 314 can be integrally formed as a unitary piece. In other embodiments, one or more retaining or securing members/clamp members/clip members/securing means can secure the housing 314 to the support portion 340.

As shown in FIG. 24, when the pedal 339 is actuated (e.g., by pressing it down as shown by arrow 500), the extension member 338 is correspondingly actuated (e.g., by moving/pivoting around the member 350 (FIG. 31) downwards, thus moving and/or tensioning the pedal cable 312, as shown by arrow 502). The pedal cable 312 then tensions the connection cables 306 of each brake assembly as shown by arrows 504, which pivots the brake levers 304 into the applied position as shown by arrows 506, thereby engaging the wheels 124. Once the pedal 339 is released, the biasing member 341 pushes the extension member 338 back into the unapplied position and the rest of the linkage responds accordingly to move the brake levers 304 to the unapplied position.

In another embodiment, as shown in FIG. 33, the brake assembly 300 can comprise raised anchors 400, each comprising two arms 402. Each raised anchor 400 can define a channel 404 between the arms 402 and extending substantially parallel to a longitudinal axis of the axle 108. The channel 404 can be sized such that portions of the brake lever 304 and the biasing member 320, can be disposed within the channel 404. A fastener 406 (such as a pin) can extend through an aperture in each arm 402 and the brake lever 304 to secure the brake lever 304 to the raised anchor 400. The brake lever 304 can be pivotably coupled such that it can pivot about the fastener 406 relative to the raised anchor 400 but is restrained from movement in other directions. The biasing member 320 can be configured to bias the brake lever 304 into the unapplied position.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, cables or pull wires, pulleys, etc., are expressly within the scope of the above terms, absent specific contrary language.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following exemplary claims.

The invention claimed is:

1. A brake assembly for a longboard, comprising:
a first brake lever member coupled to a hanger member of the longboard via a first anchor member removably coupled to the hanger member, a second brake lever member coupled to the hanger member via a second anchor member removably coupled to the hanger member, the first and second brake lever members each having a curved shape comprising a first end portion removably coupled to a brake pad, a second end portion coupled to a first cable, and a central portion coupled to a respective anchor member, the brake lever members being movable between a first position and a second position in which the first and second brake lever members are configured to contact an inner surface of a respective wheel; and
a pedal assembly coupled to the first and second brake lever members by a linkage assembly, the linkage assembly comprising the first cable coupling the first and second brake lever members, a second cable coupling the first cable to the pedal assembly, and a housing coupled to the pedal assembly through which the second cable extends, the pedal assembly comprising an extension member, a pedal coupled to a first end of the extension member, a clamp member configured to releasably couple the extension member and pedal to the longboard, and a biasing member configured to bias the pedal assembly into an unapplied position;
wherein the pedal assembly is configured to actuate the first and second brake lever members between the first position and the second position.

2. A longboard comprising the brake assembly of claim 1.

3. The brake assembly of claim 1, further comprising first and second brake lever biasing members configured to bias the first and second brake lever members away from respective wheels.

4. The brake assembly of claim 1, wherein the extension member comprises a second end portion coupled to the linkage assembly.

5. The brake assembly of claim 1, wherein the housing is a rigid tube coupled to the clamp member.

* * * * *